US009729678B2

(12) United States Patent
Laval et al.

(10) Patent No.: US 9,729,678 B2
(45) Date of Patent: Aug. 8, 2017

(54) METHODS OF PROCESSING DATA CORRESPONDING TO A DEVICE THAT CORRESPONDS TO A GAS, WATER, OR ELECTRIC GRID, AND RELATED DEVICES AND COMPUTER PROGRAM PRODUCTS

(71) Applicant: Duke Energy Corporation, Charlotte, NC (US)

(72) Inventors: Stuart Laval, Fort Mill, SC (US); Raiford Smith, Charlotte, NC (US)

(73) Assignee: DUKE ENERGY CORPORATION, Charlotte, NC (US)

( * ) Notice: Subject to any disclaimer, the term of this patent is extended or adjusted under 35 U.S.C. 154(b) by 529 days.

(21) Appl. No.: 14/264,826

(22) Filed: Apr. 29, 2014

(65) Prior Publication Data

US 2015/0097695 A1 Apr. 9, 2015

Related U.S. Application Data

(60) Provisional application No. 61/886,496, filed on Oct. 3, 2013.

(51) Int. Cl.
*G08B 23/00* (2006.01)
*H04L 29/06* (2006.01)
(Continued)

(52) U.S. Cl.
CPC .............. *H04L 69/03* (2013.01); *H04L 67/12* (2013.01); *G01D 4/004* (2013.01);
(Continued)

(58) Field of Classification Search
None
See application file for complete search history.

(56) References Cited

U.S. PATENT DOCUMENTS 4,689,752 A    8/1987   Fernandes et al.
5,341,372 A    8/1994   Kirkham
(Continued)

FOREIGN PATENT DOCUMENTS

WO    WO 2011076242 A1    6/2011

OTHER PUBLICATIONS

Huang et al., "A Study of Publish/Subscribe Systems for Real-Time Grid Monitoring", Parallel and Distributed Processing Symposium, Mar. 26-30, 2007, IPDPS 2007, pp. 1-8.
(Continued)

*Primary Examiner* — Curtis King
(74) *Attorney, Agent, or Firm* — Myers Bigel, P.A.

(57) ABSTRACT

Methods of operating a communication node are provided. A method of operating a communication node may include receiving data from an electric grid device via a network interface. The method may include processing the data from the electric grid device at the communication node. Moreover, the method may include transmitting a filtered portion of the data to an electric utility head end system, after processing the data at the communication node. In some embodiments, a method of operating a communication node may include using a message broker controlled by a virtual machine in the communication node to provide a protocol to interface with a field message bus that includes a standards-based or open-source Application Programming Interface (API). Related communication nodes and computer program products are also described.

22 Claims, 35 Drawing Sheets

(51) Int. Cl.
*H04L 29/08* (2006.01)
*G01D 4/00* (2006.01)

(52) U.S. Cl.
CPC ......... *Y02B 70/3266* (2013.01); *Y02B 90/242* (2013.01); *Y04S 20/242* (2013.01); *Y04S 20/322* (2013.01)

(56) References Cited

U.S. PATENT DOCUMENTS

| | | | |
|---|---|---|---|
| 5,495,239 A | 2/1996 | Ouellette | |
| 5,502,839 A * | 3/1996 | Kolnick | G06F 3/0481 |
| | | | 710/1 |
| 6,088,659 A * | 7/2000 | Kelley | G01D 4/004 |
| | | | 340/870.02 |
| 6,199,068 B1 | 3/2001 | Carpenter | |
| 6,246,677 B1 | 6/2001 | Nap et al. | |
| 6,327,541 B1 | 12/2001 | Pitchford et al. | |
| 6,401,081 B1 | 6/2002 | Montgomery et al. | |
| 6,405,266 B1 * | 6/2002 | Bass | G06F 9/542 |
| | | | 709/200 |
| 6,509,841 B1 | 1/2003 | Colton et al. | |
| 7,117,105 B2 | 10/2006 | Premerlani et al. | |
| 7,126,494 B2 | 10/2006 | Ardalan et al. | |
| 7,251,570 B2 | 7/2007 | Hancock et al. | |
| 7,400,264 B2 | 7/2008 | Boaz | |
| 7,415,725 B2 | 8/2008 | Henneberry et al. | |
| 7,495,578 B2 | 2/2009 | Borleske | |
| 7,558,703 B2 | 7/2009 | Stoupis et al. | |
| 7,764,943 B2 | 7/2010 | Radtke | |
| 7,852,207 B2 * | 12/2010 | Berkman | H04B 3/54 |
| | | | 340/538.16 |
| 7,945,401 B2 | 5/2011 | Bowdry et al. | |
| 8,095,923 B2 | 1/2012 | Harvey et al. | |
| 8,135,550 B2 | 3/2012 | Bose et al. | |
| 8,539,484 B1 * | 9/2013 | Offer | G06F 9/45558 |
| | | | 718/1 |
| 8,775,651 B2 | 7/2014 | Brown et al. | |
| 8,812,165 B1 * | 8/2014 | Smith | G01R 19/2513 |
| | | | 700/28 |
| 2002/0062262 A1 * | 5/2002 | Vasconi | G06Q 10/06 |
| | | | 705/26.25 |
| 2002/0133581 A1 | 9/2002 | Schwartz et al. | |
| 2005/0155033 A1 * | 7/2005 | Luoffo | G06F 9/5088 |
| | | | 718/104 |
| 2006/0067209 A1 * | 3/2006 | Sheehan | H04L 29/08846 |
| | | | 370/216 |
| 2006/0136558 A1 * | 6/2006 | Sheehan | H04L 12/2803 |
| | | | 709/203 |
| 2007/0001868 A1 | 1/2007 | Boaz | |
| 2007/0013547 A1 | 1/2007 | Boaz | |
| 2007/0013948 A1 * | 1/2007 | Bevan | G06F 3/1214 |
| | | | 358/1.15 |
| 2007/0063868 A1 | 3/2007 | Borleske | |
| 2007/0118648 A1 * | 5/2007 | Millefiorini | H04L 63/08 |
| | | | 709/225 |
| 2007/0239987 A1 | 10/2007 | Hoole et al. | |
| 2008/0052253 A1 | 2/2008 | Edwards et al. | |
| 2008/0195562 A1 | 8/2008 | Worth et al. | |
| 2009/0281674 A1 | 11/2009 | Taft | |
| 2009/0326731 A1 * | 12/2009 | Bowdry | G01D 4/004 |
| | | | 700/297 |
| 2010/0332373 A1 | 12/2010 | Crabtree et al. | |
| 2011/0196546 A1 | 8/2011 | Muller et al. | |
| 2011/0204719 A1 | 8/2011 | Sackman et al. | |
| 2011/0289133 A1 | 11/2011 | Shikano et al. | |
| 2011/0296169 A1 | 12/2011 | Palmer | |
| 2011/0316337 A1 * | 12/2011 | Pelio | H05K 7/1492 |
| | | | 307/24 |
| 2012/0029710 A1 * | 2/2012 | Dodderi | H02J 13/0079 |
| | | | 700/286 |
| 2012/0029720 A1 * | 2/2012 | Cherian | H02J 13/00 |
| | | | 700/297 |
| 2012/0054397 A1 | 3/2012 | Melvin, Jr. et al. | |
| 2012/0166610 A1 | 6/2012 | Doh et al. | |
| 2012/0217803 A1 | 8/2012 | Talkin et al. | |
| 2012/0266209 A1 | 10/2012 | Gooding et al. | |
| 2012/0310558 A1 * | 12/2012 | Taft | H02J 3/00 |
| | | | 702/61 |
| 2012/0316689 A1 | 12/2012 | Boardman et al. | |
| 2012/0316696 A1 * | 12/2012 | Boardman | H02J 13/0086 |
| | | | 700/297 |
| 2012/0324255 A1 | 12/2012 | Goodnow et al. | |
| 2013/0024149 A1 | 1/2013 | Nayar et al. | |
| 2013/0054044 A1 * | 2/2013 | Shaffer | H02J 3/14 |
| | | | 700/297 |
| 2014/0051506 A1 * | 2/2014 | Ameling | G06Q 99/00 |
| | | | 463/29 |
| 2014/0280628 A1 * | 9/2014 | Ross | H04L 45/12 |
| | | | 709/206 |
| 2016/0043815 A1 | 2/2016 | Panaitopol et al. | |

OTHER PUBLICATIONS

Abelsen et al., "Adaptive Information Flow Mechanisms and Management for Power Grid Contingencies", Washington State University School of Electrical Engineering and Computer Science, Pullman, Washington, USA, 2007.

* cited by examiner

METHODS OF PROCESSING DATA CORRESPONDING TO A DEVICE THAT CORRESPONDS TO A GAS, WATER, OR ELECTRIC GRID, AND RELATED DEVICES AND COMPUTER PROGRAM PRODUCTS

CLAIM OF PRIORITY

The present application claims the benefit of U.S. Provisional Patent Application Ser. No. 61/886,496, filed Oct. 3, 2013, entitled Methods of Processing Data Corresponding to an Electric Grid Device, and Related Communication Nodes and Computer Program Products, the disclosure of which is hereby incorporated herein in its entirety by reference.

FIELD

The present disclosure relates to data that corresponds to a gas, water, or electric grid.

BACKGROUND

An electric grid may include various electric grid devices, which may be intelligent, interconnected equipment that deliver, monitor, measure, and/or control the flow of electricity in a power delivery system. The electric grid may also include a telecommunications infrastructure for transporting and delivering information regarding the electric grid, as well as analytics, architecture, and data-management tools for managing/optimizing the electric grid. Moreover, a wide variety of electric grid customer-owned assets, which may consume, store, or produce electricity, may be connected to the electric grid.

As an electric grid, and various interconnected customer-owned devices and electric grid devices in the electric grid, become more complex, it may be more difficult to meet electric utility customers' demands regarding response times, costs, safety, and reliability. For example, an electric grid may reach diverse geographies, customers, and vendor technologies. Accordingly, processing data and managing electric grid devices may be costly and time-consuming.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present inventive concepts.

Various embodiments of the present inventive concepts include a method of operating a communication node. The method may include receiving data from an electric grid device via a network interface. In some embodiments, the network interface may include a local area network interface or a wide area network interface. The method may include processing the data from the electric grid device at the communication node. In some embodiments, processing the data may include reading Application Layer data at the communication node. Moreover, the method may include transmitting a filtered portion of the data to a data center including an electric utility head end system, after processing the data at the communication node. In some embodiments, a computer program product including a non-transitory computer readable storage medium including computer readable program code therein may be configured to perform the method.

According to various embodiments, the filtered portion of the data received from the electric grid device may include at least one electric grid parameter, networking parameter, customer parameter, security parameter, device identification parameter, or time-stamp parameter. In some embodiments, the electric grid device parameter may be a voltage. Additionally or alternatively, it will be understood that operations of processing the data may include determining a response decision, with respect to the electric grid device or with respect to another electric grid device regarding which the electric grid device provides the data. In some embodiments, the method may include transmitting the response decision to the electric utility head end system.

In various embodiments, the electric grid device may be a first electric grid device, and the communication node may be a first communication node corresponding to the first electric grid device. Moreover, the method may include transmitting the filtered portion of the data to a second communication node corresponding to a second electric grid device, via a field message bus. Additionally or alternatively, the method may include receiving filtered data from a second communication node corresponding to a second electric grid device, via a field message bus. In some embodiments, the first and second communication nodes may correspond to different first and second vendors, respectively. Additionally or alternatively, the first and second communication nodes may correspond to different first and second hierarchical tiers, respectively, in a hierarchical arrangement of communication nodes.

A method of operating a communication node, according to various embodiments, may include using a message broker controlled by a virtual machine in the communication node to provide a protocol to interface with a field message bus including a standards-based or open-source Application Programming Interface (API). Moreover, the method may include transmitting or receiving data corresponding to an electric grid device, via the field message bus. In some embodiments, a computer program product including a non-transitory computer readable storage medium including computer readable program code therein may configured to perform the method.

In various embodiments, the communication node may be a first communication node, and the field message bus may interface with a second communication node. Moreover, the first and second communication nodes may be respective peer communication nodes having the field message bus therebetween. In some embodiments, the first and second communication nodes may correspond to different first and second vendors, respectively. Additionally or alternatively, the first and second communication nodes may correspond to different first and second hierarchical tiers, respectively, in a hierarchical arrangement of communication nodes.

According to various embodiments, the method may include using the protocol of the message broker to interface with a translator unit that is between a device protocol and the field message bus. Additionally or alternatively, the method may include using the protocol of the message broker to interface with a standards-based or open-source-API-based application in the communication node. In some embodiments, the method may include using the protocol of the message broker to interface with a plurality of field message buses.

According to various embodiments, the virtual machine may operate using an application processor or a partition of a central processing unit of the communication node. Additionally or alternatively, the method may include isolating an application processing unit of the communication node from a central processing unit of the communication node, using the virtual machine.

A communication node, according to various embodiments, may include a network interface configured to provide communications with a first electric grid device. The communication node may include a processor configured to control a virtual machine in the communication node. Moreover, the virtual machine may be configured to provide a message broker that is configured to interface with a field message bus and/or another communication node corresponding to a second electric grid device. In some embodiments, the first electric grid device may be an electric utility meter, a transformer, a light, an electric grid control device, an electric grid protection device, a line sensor, a weather sensor, an Advanced Metering Infrastructure (AMI) device, an analog or digital sensor connected to an electric utility asset, an electric generator, an electric turbine, an electric boiler, an electric vehicle, an intelligent switching device, a home appliance, a battery storage device, a capacitor device, a solar power device, a smart generation device, an emission monitoring device, or a voltage regulator.

In various embodiments, the network interface may include a local area network interface configured to provide communications with the first electric grid device. In some embodiments, the local area network interface may be configured to provide communications with a plurality of electric grid devices.

According to various embodiments, the network interface may be configured to receive data from the first electric grid device via the network interface. Moreover, the virtual machine may be configured to process the data from the first electric grid device at the communication node, and the virtual machine may be configured to control transmission of a filtered portion of the data to an electric utility head end system, after processing the data at the communication node. In some embodiments, the filtered portion of the data received from the first electric grid device may include at least one electric grid device parameter (e.g., a voltage), networking parameter, customer parameter, security parameter, device identification parameter, or time-stamp parameter.

In various embodiments, the virtual machine may be configured to process the data from the first electric grid device by determining a response decision, with respect to the first electric grid device or with respect to a third electric grid device regarding which the first electric grid device provides the data. In some embodiments, the virtual machine may be configured to control transmission of the response decision to the electric utility head end system. Moreover, in some embodiments, the virtual machine may be configured to process the data from the first electric grid device by reading Application Layer data from the electric grid device.

According to various embodiments, the communication node may be a first communication node corresponding to the first electric grid device, and the other communication node may be a second communication node corresponding to the second electric grid device. Moreover, the virtual machine may be configured to control transmission of the filtered portion of the data to the second communication node corresponding to the second electric grid device, via the field message bus. Additionally or alternatively, the virtual machine may be configured to receive filtered data from the second communication node corresponding to the second electric grid device, via the field message bus. In some embodiments, the electric utility head end system may be configured to provide communications via a data center message bus, and the field message bus may be configured to provide communications independently of the data center message bus.

According to various embodiments, the field message bus may include a standards-based or open-source Application Programming Interface (API). Moreover, the message broker may be configured to provide a protocol to interface with the field message bus that includes the standards-based or open-source API, and the virtual machine may be configured to transmit or receive data corresponding to the second electric grid device, via the field message bus. In some embodiments, the communication node may be a first communication node, the other communication node may be a second communication node configured to interface with the field message bus, and the first and second communication nodes may be respective peer communication nodes including the field message bus therebetween. Moreover, in some embodiments, the first and second communication nodes may correspond to different first and second vendors, respectively.

In various embodiments, the protocol of the message broker may be configured to interface with a translator unit that is between a device protocol and the field message bus. Additionally or alternatively, the protocol of the message broker may be configured to interface with a standards-based or open-source-API-based application in the communication node. Moreover, the protocol of the message broker may be configured to interface with a plurality of field message buses.

According to various embodiments, the virtual machine may be configured to operate using an application processor or a partition of a central processing unit of the communication node. In some embodiments, the virtual machine may be configured to isolate an application processing unit of the communication node from a central processing unit of the communication node.

A method of operating a first device corresponding to a gas, water, or electric grid, according to various embodiments, may include receiving data, via a network interface, from a second device corresponding to the gas, water, or electric grid. The method may include processing the data from the second device at the first device. Moreover, the method may include transmitting a filtered portion of the data to a data center including an utility head end system corresponding to the gas, water, or electric grid, after processing the data at the first device. In some embodiments, a computer program product including a non-transitory computer readable storage medium that includes computer readable program code therein may be configured to perform the method.

In various embodiments, the network interface may include a local area network interface or a wide area network interface. Moreover, the filtered portion of the data received from the second device may include at least one electric grid parameter, water grid parameter, gas grid parameter, networking parameter, customer parameter, security parameter, device identification parameter, or time-stamp parameter. In some embodiments, processing the data may include determining a response decision at the first device, with respect to the data received from the second device. Moreover, the response decision may include a response to an event at the second device or at a third device corresponding to the gas, water, or electric grid.

According to various embodiments, the method may include transmitting the response decision to the utility head end system. In some embodiments, the method may include transmitting the response decision to a third device corresponding to the gas, water, or electric grid. Moreover, the first, second, and third devices may include first, second, and third electric grid devices, respectively, corresponding to the electric grid, and transmitting the response decision may include transmitting the response decision from the first electric grid device to the utility head end system and to the third electric grid device. Alternatively, the first and second devices may include first and second electric grid devices, respectively, corresponding to the electric grid, the third device may include a communication node corresponding to a third electric grid device that corresponds to the electric grid, and transmitting the response decision may include transmitting the response decision from the first electric grid device to the utility head end system and to the communication node corresponding to the third electric grid device. Alternatively, the first device may include a communication node corresponding to a first electric grid device that corresponds to the electric grid, the second and third devices may include second and third electric grid devices, respectively, corresponding to the electric grid, and transmitting the response decision may include transmitting the response decision from the communication node corresponding to the first electric grid device to the utility head end system and to the third electric grid device.

In various embodiments, processing the data may include reading Application Layer data at the first device. Moreover, the utility head end system may be configured to provide communications via a data center message bus, and the method may include transmitting the filtered portion of the data to a third device corresponding to the gas, water, or electric grid, via a field message bus that is configured to provide communications independently of the data center message bus. In some embodiments, the first and second devices may correspond to different first and second vendors, respectively. In some embodiments, the first device may include an electric grid device, a water grid device, a gas grid device, a telecommunications system device, a server, or a home appliance.

A method of operating a first device corresponding to a gas, water, or electric grid, according to various embodiments, may include using a message broker and/or message client including an embedded protocol that is standardized with respect to a field message bus that includes a standards-based or open-source Application Programming Interface (API), at the first device. The method may include transmitting or receiving data corresponding to a second device corresponding to the gas, water, or electric grid, via the field message bus. Moreover, the first device may be spaced apart from a data center including an utility head end system, and the field message bus may be configured to provide communications independently of a data center message bus of the utility head end system. In some embodiments, a computer program product including a non-transitory computer readable storage medium that includes computer readable program code therein may be configured to perform the method.

In various embodiments, the first and second devices may correspond to different first and second vendors, respectively. In some embodiments, the method may include using the embedded protocol of the message broker and/or the message client to interface with a translator unit that is between a device protocol and the field message bus. In some embodiments, the method may include using the embedded protocol of the message broker and/or the message client to interface with a standards-based or open-source-API-based application in the first device. Moreover, in some embodiments, the method may include using the embedded protocol of the message broker and/or the message client to interface with a plurality of field message buses.

A first device corresponding to a gas, water, or electric grid, according to various embodiments, may include a network interface configured to provide communications with a second device corresponding to the gas, water, or electric grid, via a field message bus including a standards-based or open-source Application Programming Interface (API). The first device may include a processor configured to control a message broker and/or message client in the first device, the message broker and/or message client including an embedded protocol that is standardized with respect to the field message bus. Moreover, the first device may be spaced apart from a data center including an utility head end system, and the field message bus may be configured to provide communications independently of a data center message bus of the utility head end system.

In various embodiments, the network interface may include a local area network interface or a wide area network interface configured to provide communications with the second device. The network interface may be configured to provide communications with a plurality of devices corresponding to the gas, water, or electric grid.

According to various embodiments, the first device may include an electric utility meter, a transformer, a light, an electric grid control device, an electric grid protection device, a line sensor, a weather sensor, an Advanced Metering Infrastructure (AMI) device, an analog or digital sensor connected to an electric utility asset, an electric generator, an electric turbine, an electric boiler, an electric vehicle, an intelligent switching device, a home appliance, a battery storage device, a capacitor device, a solar power device, a smart generation device, an emission monitoring device, a water heater, a server, or a voltage regulator.

In various embodiments, the network interface may be configured to receive data from the second device via the network interface. The processor may be configured to process the data from the second device at the first device. Moreover, the processor may be configured to control transmission of a filtered portion of the data to the utility head end system, after processing the data at the first device. In some embodiments, the filtered portion of the data received from the second device may include at least one electric grid parameter, water grid parameter, gas grid parameter, networking parameter, customer parameter, security parameter, device identification parameter, or time-stamp parameter.

According to various embodiments, the first and second devices may correspond to different first and second vendors, respectively. In some embodiments, the embedded protocol of the message broker and/or message client may be configured to interface with a translator unit that is between a device protocol and the field message bus. In some embodiments, the embedded protocol of the message broker and/or message client may be configured to interface with a plurality of field message buses.

A first device corresponding to a gas, water, or electric grid, according to various embodiments, may be provided. The first device may include a network interface configured to provide communications with a second device corresponding to the gas, water, or electric grid, via a field message bus including a standards-based or open-source Application Programming Interface (API). Moreover, the first device may include a processor configured to control a brokerless messaging protocol in the first device, and the brokerless messaging protocol may be an embedded protocol that is standardized with respect to the field message bus.

The first device may be spaced apart from a data center including an utility head end system. The field message bus may be configured to provide communications independently of a data center message bus of the utility head end system. In some embodiments, the processor may be configured to control the brokerless messaging protocol to communicate with a protocol of a message broker in a third device, via a local area network. In some embodiments, the processor may be configured to control the brokerless messaging protocol to communicate with the second device via the field message bus, and the processor may be configured to control a protocol of a message broker in the first device to communicate with a third device via a local area network.

In various embodiments, the processor may be configured to control the brokerless messaging protocol to contextualize data independently of (i.e., outside of) the data center. In some embodiments, the first device further may include a memory that includes an enterprise-wide security application that is on every device in an enterprise that the first and second devices. In some embodiments, the processor may be configured to control communications via the field message bus according to an enterprise-wide semantic model (e.g., a common semantic model). Moreover, the processor may be configured to control a determination of capabilities of the second device, and the processor may be configured to control incorporation (e.g., inclusion/input) of the capabilities of the second device into the enterprise-wide semantic model.

According to various embodiments, the processor may be configured to share a portion of a processing capacity or a storage capacity of the first device with the second device. In some embodiments, the first device may include reprogrammable hardware, and the processor may be configured to reprogram the reprogrammable hardware in response to a command received (at the first device) via the field message bus.

It is noted that aspects of the present inventive concepts described with respect to one embodiment may be incorporated in a different embodiment although not specifically described relative thereto. That is, all embodiments and/or features of any embodiment can be combined in any way and/or combination. Applicants reserve the right to change any originally filed claim or file any new claim accordingly, including the right to be able to amend any originally filed claim to depend from and/or incorporate any feature of any other claim although not originally claimed in that manner. These and other objects and/or aspects of the present inventive concepts are explained in detail below.

BRIEF DESCRIPTION OF THE DRAWINGS

The accompanying drawings, which form a part of the specification, illustrate various embodiments of the present inventive concepts. The drawings and description together serve to fully explain embodiments of the present inventive concepts.

DETAILED DESCRIPTION

Figure 1A:
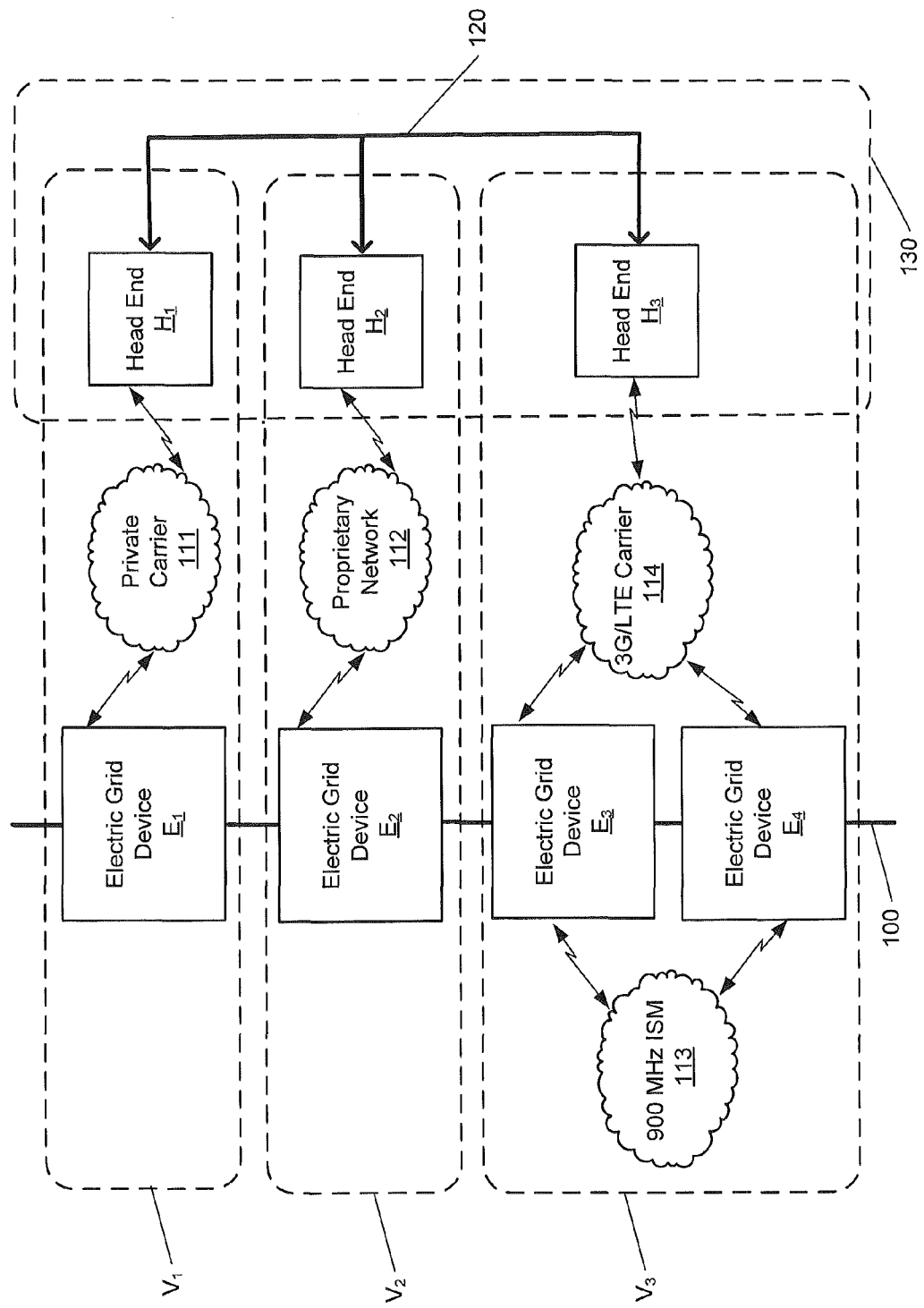
FIG. 1A is a prior art schematic illustration of a data center message bus at an electric utility data center.

Specific example embodiments of the present inventive concepts now will be described with reference to the accompanying drawings. The present inventive concepts may, however, be embodied in a variety of different forms and should not be construed as limited to the embodiments set forth herein. Rather, these embodiments are provided so that this disclosure will be thorough and complete and will fully convey the scope of the present inventive concepts to those skilled in the art. In the drawings, like designations refer to like elements. It will be understood that when an element is referred to as being "connected," "coupled," or "responsive" to another element, it can be directly connected, coupled or responsive to the other element or intervening elements may be present. Furthermore, "connected," "coupled," or "responsive" as used herein may include wirelessly connected, coupled, or responsive.

The terminology used herein is for the purpose of describing particular embodiments only and is not intended to be limiting of the present inventive concepts. As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. The symbol "/" is also used as a shorthand notation for "and/or."

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will also be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of the present inventive concepts.

Example embodiments of the present inventive concepts may be embodied as nodes and methods. Accordingly, example embodiments of the present inventive concepts may be embodied in hardware and/or in software (including firmware, resident software, micro-code, etc.). Furthermore, example embodiments of the present inventive concepts may take the form of a computer program product comprising a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example embodiments of the present inventive concepts are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Many solutions for managing electric grid devices and/or providing data regarding electric grid devices are proprietary, are designed for use in only one silo (e.g., are incapable of exchanging information with other systems, vendors), and/or interoperate with other systems only after expensive and time-consuming integration efforts. For example, an electric grid may reach diverse geographies, customers, and vendor technologies that are not interoperable and therefore may not be capable of providing a necessary capability within a reasonable time period to meet new or current needs. Various embodiments of the inventive concepts described herein, however, facilitate interoperability and interchangeability between various operational technologies and augment these technologies by providing an interface for the efficient sharing and processing of data closer to the asset(s) (e.g., one or more electric grid devices), to rapidly, reliably, and safely execute operational functions of the electric grid. As an example, it will be understood that interchangeability, as described herein, may refer to the plug-and-play ability to add a new node (e.g., an end point) to a network/grid without having to set up the node using a head end system.

Specifically, a field message bus, on a communication node, can facilitate interoperability and interchangeability between various operational technologies. The technologies may include, for example, Supervisory Control and Data Acquisition (SCADA), Energy Management System (EMS), Distribution Management System (DMS), Outage Management System (OMS), Meter Data Management (MDM), etc. Moreover, the field message bus may also augment such technologies by providing a common publish/subscription (pub/sub) logical interface for local data access, distributed intelligence, and peer-to-peer wireless communication on the electric grid. Further value can be delivered by smart-grid activities, and the know-how can be shared with the utility industry to drive standardization among the vendor community, resulting in greater economies of scale, improved economics of smart grid technology deployment, enhanced asset performance, and a step closer toward convergence between Information Technology (IT), Operational Technology (OT), and telecommunications activities (e.g., different telecommunications networks) of a grid.

In particular, communication nodes may provide a standards-based, modular communication platform, and may be configured to communicate via a standards-based or open-source, broker-agnostic, peer-to-peer, and distributed field message bus architecture. Moreover, the pub/sub messaging interface provided by the field message bus may improve not only the simplicity, integrity, and security of information exchanges between disparate assets in the field, but may also inherently filter a significant amount of unused data overhead, and may reduce/eliminate the need to backhaul all raw data to a central data center. These benefits can translate into vast savings in the cost of operating IT systems and telecommunications networks and can achieve further value by enabling deployed control schemes that are not presently feasible without distributed decision-making closer to the electric grid assets.

Additionally, the field message bus provides a messaging technology that can seamlessly integrate with existing communication nodes, without disrupting any hardware and software functions presently on board. This noninvasive implementation may employ a Virtual Machine (VM) to functionally isolate a communication node's application processing unit(s), where the message bus and its supporting logic may reside, from a Central Processing Unit (CPU), where existing network manager administrative functions may continue to operate concurrently and securely backhaul all raw streaming SCADA data through each data collector module, wired communication port, or radio modem. In parallel, the VM may listen to this existing pass-through device data and publish, by exception, copies of select shared data points to the field message bus. Likewise, the VM may also allow Intelligent Electronic Devices (IEDs) connected to the communication node to subscribe to the field message bus for protection and control commands published by the decoupled application processor(s). Loosely coupled to the VM may be a wide variety of standards-based or open-source protocol adapters (e.g., Modbus, Distributed Network Protocol (DNP), Simple Network Management Protocol (SNMP), IEC61850, etc.), object models (e.g., Common Information Model (CIM), and message brokers using standards-based messaging protocols (e.g., Message Queuing Telemetry Transport (MQTT), Advanced Messaging Queuing Protocol, AMQP, etc.) that collectively may compress, decompress, encrypt, and translate data between disparate devices, use-case application logic, and other communication nodes' field message buses.

It will be understood that the field message bus may have a wide number of use-cases, including but not limited to Volt-VAR Optimization (VVO), self healing, Distributed Energy Resource Management System (DERMS), microgrid management, Photovoltaic (PV) smoothing, transformer monitoring, battery storage management, etc. The field message bus may be used with various messaging protocols, including but not limited to AMQP, MQTT, Data Distribution Service (DDS), Java Message Service (JMS)), etc. Moreover, the field message bus may be used with various brokers/clients, such as Red Hat, Mosquitto, Webmethods, MQ, Apache, VMWare, etc., on different Operating Systems (OSs) (e.g., Google Android, Microsoft Windows, Red Hat Enterprise Linux (RHEL), Embedded Linux (E-Linux), etc.). Also, the field message bus may be used with various wireless and wired communication mediums, such as WiFi, 3G, Long Term Evolution (LTE), 900 MegaHertz (MHz) Industrial, Scientific and Medical (ISM), Low Voltage (LV) or Medium/Mid Voltage (MV) Power Line Communication/Carrier (PLC), Point-to-Point Radios, Microwave, ethernet, fiber-optics, serial, etc.

Accordingly, where vendors provide local data access from their devices and application logic software, support head-end adapters and client applications to a common logical interface, and provide communication node firmware support for implementing a field message bus, the field message bus may seamlessly integrate with existing communication nodes and may facilitate interoperability between various operational technologies. For example, the field message bus may enable interoperability and interchangeability at all grid devices connected to a local area network of any communication node and any upstream head end system, using any telecommunications backhaul. In particular, using a virtual machine along with a standards-based or open-source API and a bus, as described herein, may enable modularity of hardware, telecommunications, and software, as well as picking the best-in-breed technology, without having to worry about the integration between them because they all have a common information medium to share data. Moreover, in an environment where Distributed Energy Resources (DERs) may be rapidly adopted and where microgrids may benefit from faster response times and cost-effective integration with a wide variety of equipment, the field message bus can improve response times, reduce costs, improve safety, and improve reliability.

Referring now to FIG. 1A, a prior art schematic illustration is provided of a data center message bus 120 at an electric utility data center 130 (e.g., a central office of an electric utility). The data center message bus 120 connects head end systems $H_1$-$H_3$, which are each connected to one or more electric grid devices E via respective communication networks. For example, electric grid device $E_1$ communicates with head end system $H_1$ via a private carrier network 111, electric grid device $E_2$ communicates with head end system $H_2$ via a proprietary network 112, and electric grid devices $E_3$ and $E_4$ communicate with head end system $H_3$ via a 3G/LTE network 114. Moreover, the electric grid devices $E_3$ and $E_4$ communicate with each other via a 900 MHz ISM network 113. The electric grid devices $E_1$-$E_4$ are each an element of an electric grid 100.

The electric grid devices $E_1$, $E_2$, and $E_3$ and $E_4$ correspond to (e.g., belong to) different respective vendors $V_1$-$V_3$, which may be different hardware/software manufacturers. Moreover, communications via the communication networks 111-114, regarding the electric grid devices $E_1$-$E_4$, are not shared/understood between the vendors $V_1$-$V_3$ until after reaching the data center message bus 120. Sharing data between the electric grid devices $E_1$-$E_4$ may therefore be slow and inefficient.

Figure 1B:
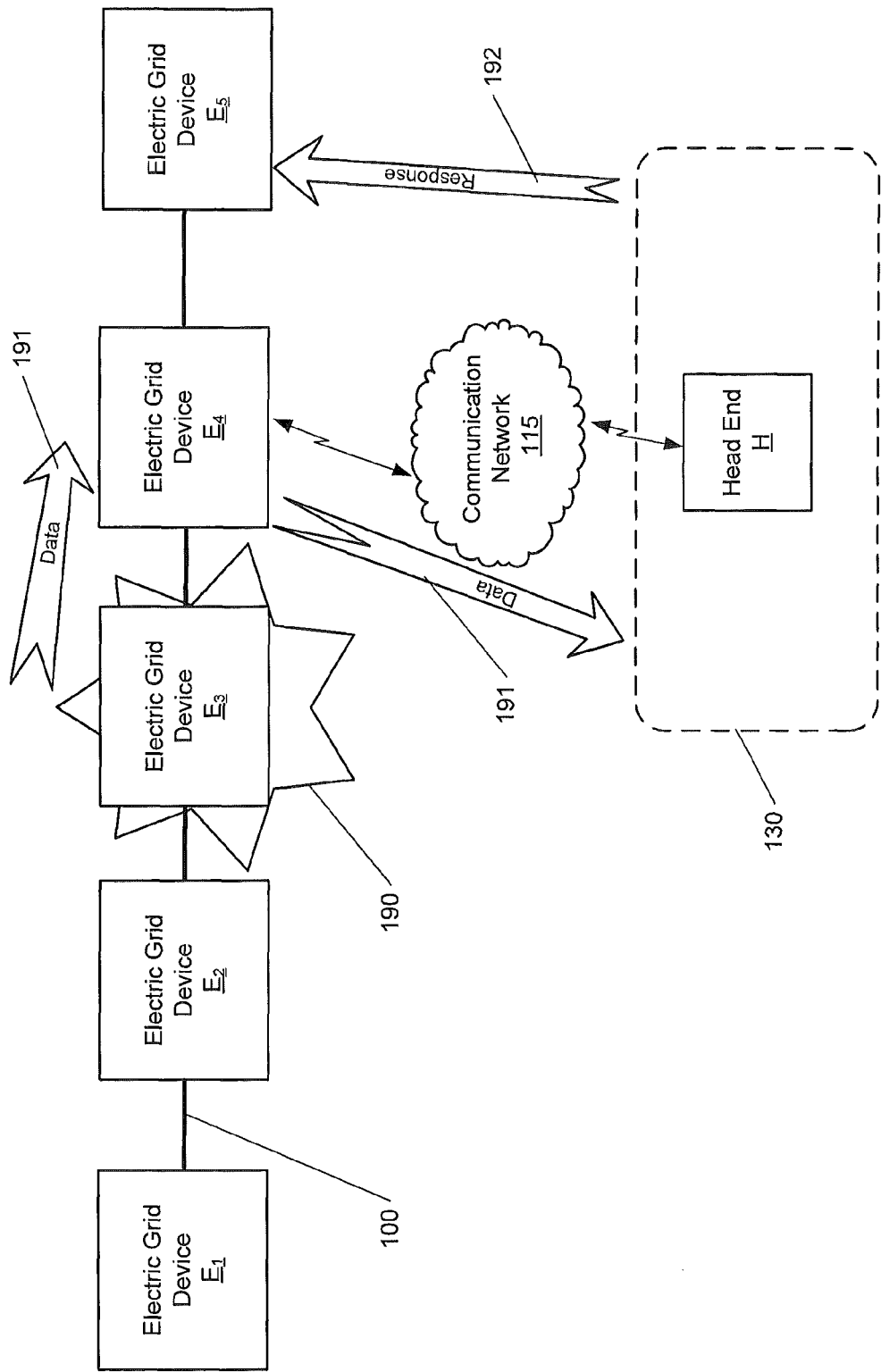
FIG. 1B is a prior art schematic illustration of determining a response, at an electric utility data center, to an event regarding an electric grid device.

Referring now to FIG. 1B, a prior art schematic illustration is provided of determining a response 192, at an electric utility data center 130, to an event 190 regarding an electric grid device $E_3$. For example, the event 190 may be a rapid swing in production. In response to the event 190 at the electric grid device $E_3$, data 191 regarding the electric grid device $E_3$ is transmitted to the electric utility data center 130 via at least one communication network 115 (e.g., a cellular network). Moreover, the electric grid device $E_3$ may be a street light, a load bank, or a DER, such as a battery or a PV inverter, and may transmit the data 191 to the communication network 115 via an electric grid device $E_4$, such as a distribution line sensor or a transformer monitoring device (e.g., a metrology chipset embedded inside a node). The communication network 115 may include one or more wireless or wired communication networks, such as the types of communication networks 111-114 illustrated in FIG. 1A.

The electric utility data center 130 determines a response 192 to the event 190, and then transmits the response 192 to one or more of the electric grid devices $E_1$-$E_5$. In particular, the electric utility data center 130 includes at least one head end system H (e.g., one or more of the head end systems $H_1$-$H_3$ illustrated in FIG. 1A), and determines the response 192 after receiving the data 191 at the head end system H (e.g., a distribution line sensor head end or a meter head end). In addition to determining the response 192, the electric utility data center 130 updates (e.g., using a DMS therein) a model of the electric grid 100 responsive to receiving the data 191. FIG. 1B's centralized approach of determining the response 192 at the electric utility data center 130, however, is a slow and inefficient way to respond to the event 190.

Figure 1C:
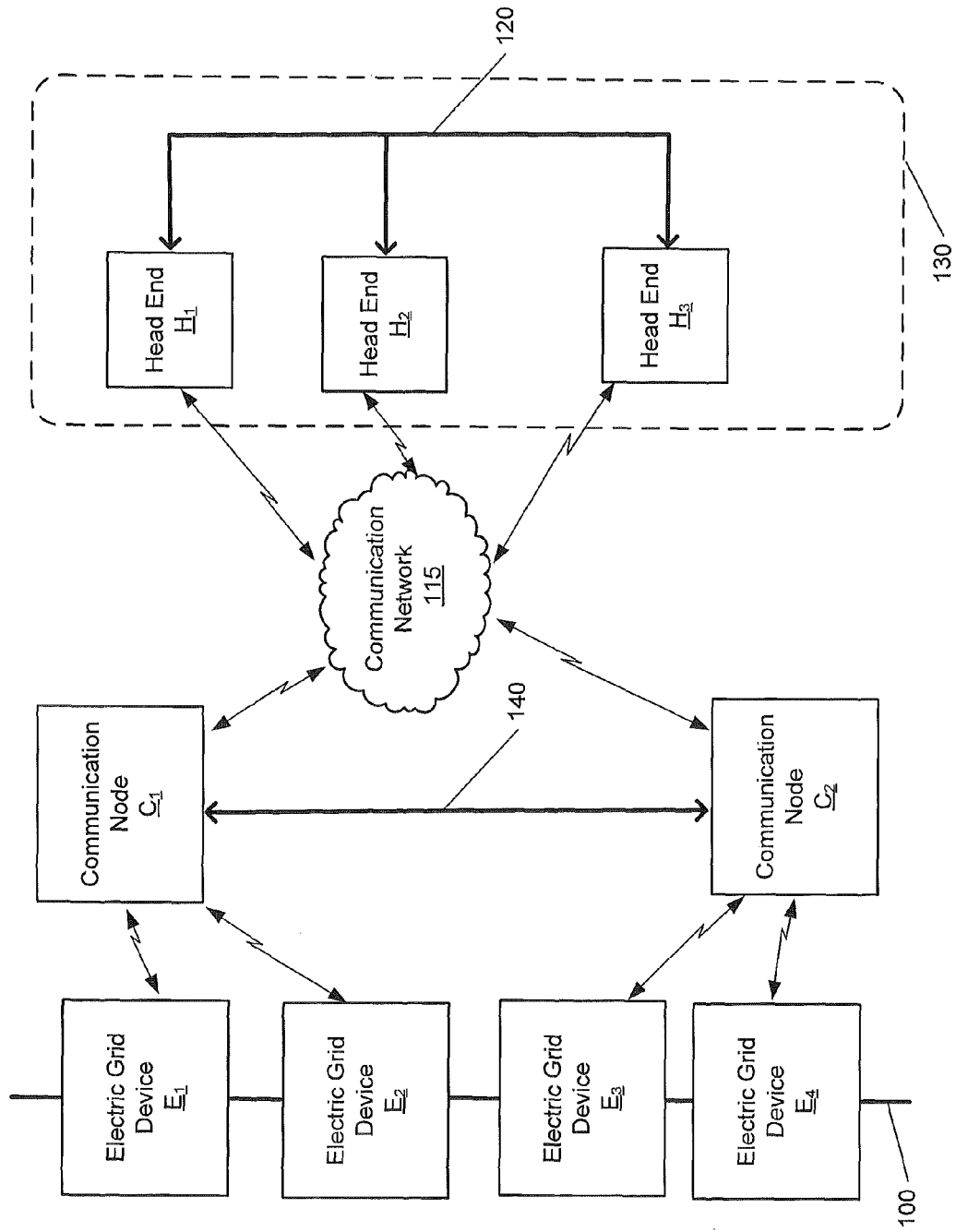
FIG. 1C is a schematic illustration of a field message bus used by communication nodes corresponding to electric grid devices, according to various embodiments.

Referring now to FIG. 1C, a schematic illustration is provided of a field message bus 140 used by communication nodes $C_1$ and $C_2$ corresponding to electric grid devices $E_1$, $E_2$ and $E_3$, $E_4$, respectively, according to various embodiments. In particular, the communication nodes $C_1$ and $C_2$ may communicate data regarding the electric grid devices $E_1$-$E_4$ before, or independently of, communicating data to the data center message bus 120 at the electric utility data center 130. Specifically, the field message bus 140 allows the communication nodes $C_1$ and $C_2$ to read/understand data that otherwise could only be read by a head end system H at an electric utility data center 130. For example, the field message bus 140 may host data (e.g., as a virtual host), and communication nodes C may process the data.

The communication nodes $C_1$ and $C_2$ may communicate with the electric utility data center 130 via the communication network 115. The communication network 115 may include one or more wireless or wired communication networks, such as fiber, Ethernet, or WiFi networks, or one or more of the types of communication networks 111-114 illustrated in FIG. 1A.

Figure 1D:
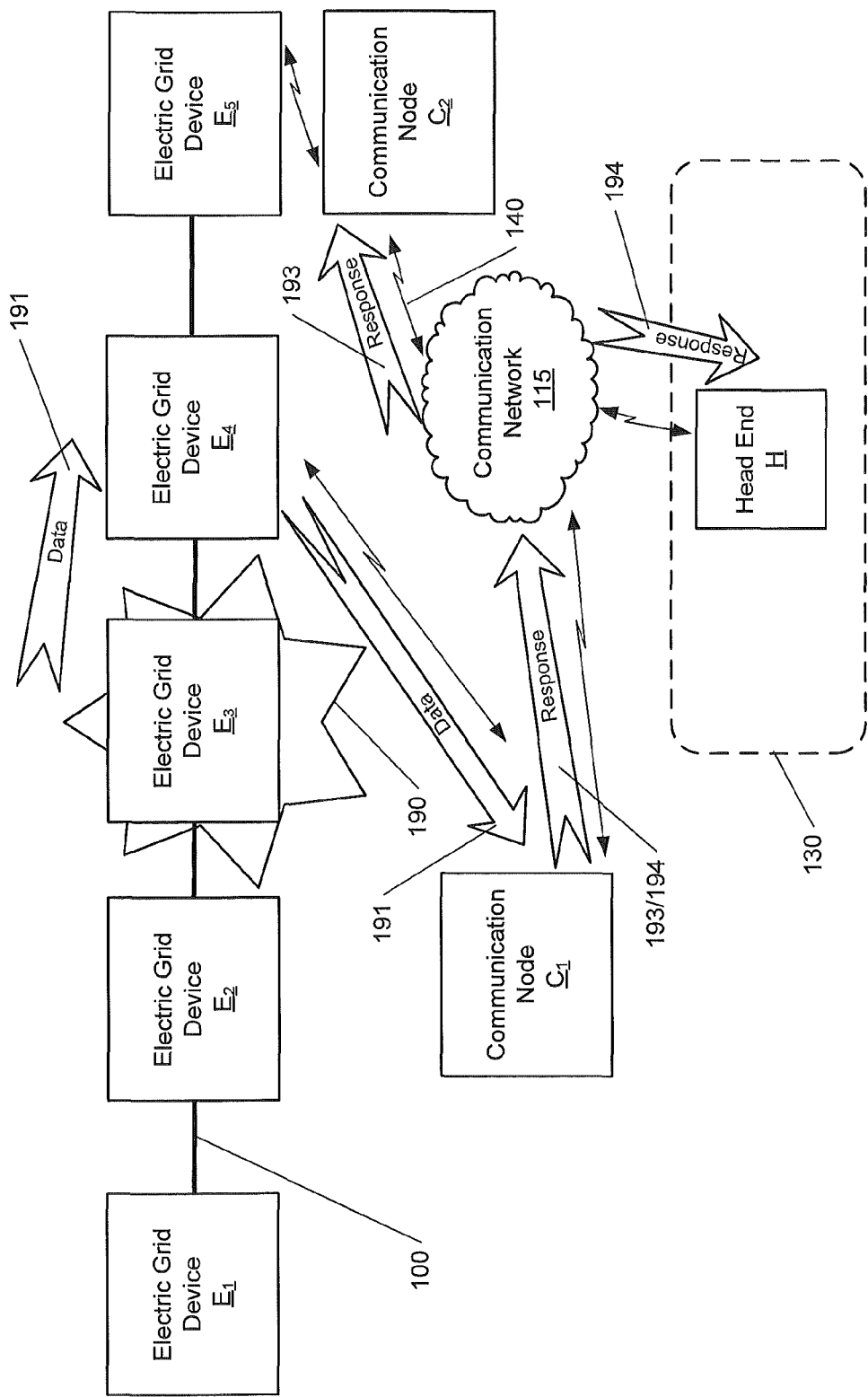
FIG. 1D is a schematic illustration of determining a response, at a communication node, to an event regarding an electric grid device, according to various embodiments.

Referring now to FIG. 1D, a schematic illustration is provided of determining a response 193/194, at a communication node $C_1$, to an event 190 regarding an electric grid device $E_3$, according to various embodiments. In contrast with determining a centralized response 192 at the electric utility data center 130, as illustrated in FIG. 1B, the distributed-decision-making approach illustrated in FIG. 1D of determining the response 193/194 at the communication node $C_1$ may significantly improve decision/response times, reduce outage times, and reduce system operating costs. For example, the centralized response 192 illustrated in FIG. 1B may take longer than fifteen minutes, whereas the distributed response 193/194 illustrated in FIG. 1D may take less than one second. Moreover, it will be understood that a distributed approach, as described herein, may refer to a multi-tier, connected network in which an application may be at one level/tier of the network and inputs may be local to an electric grid device E at a different level/tier. In other words, hardware, software, and telecommunications can be at any level/tier of the network. Moreover, various embodiments described herein may provide interoperability and interchangeability of hardware and software with Virtual LAN (VLAN) routers connected to a higher tier node's message bus.

The communication node $C_1$ may transmit the response 193/194 to both the electric utility data center 130 and one or more of the electric grid devices $E_1$-$E_5$ (e.g., via the field message bus 140 and the communication node $C_2$). In other words, the response 193 may include the same content/data as the response 194, but may have a different destination. Accordingly, it will be understood that a network interface of the communication node $C_1$ may be capable of multi-cast communications (e.g., sending a transmission to both the communication node $C_2$ and the head end system H and/or to multiple communication nodes C) or peer-to-peer communications. Moreover, a DMS of the electric utility data center 130 may update a model of the electric grid 100 responsive to receiving the response 194. As the distributed-decision-making approach in FIG. 1D occurs closer to the electric grid devices $E_1$-$E_5$ and reduces the burden on the electric utility data center 130, it may significantly improve decision/response times, reduce outage times, and reduce system operating costs.

Figure 1E:
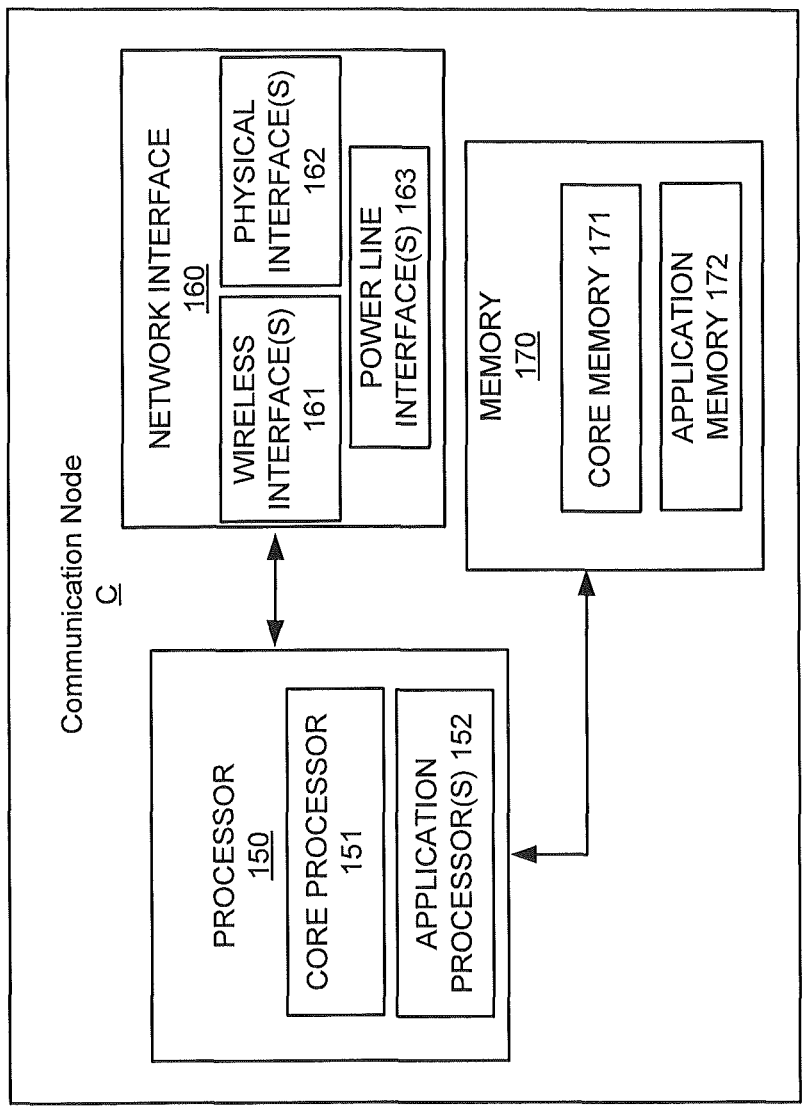
FIG. 1E is a block diagram of a communication node of FIGS. 1C and 1D, according to various embodiments.

Referring now to FIG. 1E, a block diagram is provided of a communication node C, according to various embodiments. The communication node C may be one of the communication nodes $C_1$ and $C_2$ of FIGS. 1C and 1D, and may include a processor 150 (including a core processor 151 and one or more application processors 152), a network interface 160, and a memory 170. The network interface 160 is configured to provide a communications interface with a field area network (which includes one or more field message buses), one or more local area networks, and/or one or more wide area networks (which may communicate with OT systems and/or other communication nodes C). For example, the network interface 160 may be configured to provide communications with an electric grid device E and/or a field message bus 140. The network interface 160 may be for wired and/or wireless communications. Moreover, the processor 150 may be configured to control a virtual machine in the communication node C, where the virtual machine may be configured to provide a message broker that is configured to interface with the field message bus 140 and/or another communication node C.

The processor 150 of the communication node C may be coupled to the network interface 160. The processor 150 may be configured to communicate with electric grid devices E, other communication nodes C, and/or the electric utility data center 130 via the network interface 160. For example, the network interface 160 may include one or more wireless interfaces 161 (e.g., 3G/LTE, other cellular, WiFi, Global Positioning System (GPS) interfaces, etc.) and one or more physical interfaces 162 (e.g., Ethernet, serial, Universal Serial Bus (USB) interfaces, etc.). Moreover, the network interface 160 may optionally include one or more PLC interfaces 163 (e.g., Low Voltage (LV) or MV PLC). Additionally, the wireless interface(s) 161 may optionally include 900 MHz radio.

Referring still to FIG. 1E, the memory 170 may be coupled to the processor 150, and may include a core memory 171 and an application memory 172. The memory 170 may also store instructions/algorithms used by the processor 150. The application memory 172 may store third-party applications, such as security/analytics applications. It will be understood that the capability to add various third-party applications to the application memory 172 can provide flexibility to the communication node C.

Moreover, the communication node C may optionally include a metrology chip that can obtain voltage/current data every second. Accordingly, such voltage/current data can be processed locally in the communication node C, which may be significantly faster than backhauling the data through a head end system H.

The communication node C may include core hardware components such as a power supply, 20 MHz or higher speed processor(s), and 1 Megabyte (MB) or more of RAM. The communication node C may also have a memory storage such as 1 MB or more of storage (e.g., Secure Digital (SD), MultiMediaCard (MMC), other Flash, etc.). Such modest core hardware components (in contrast with those of servers, super computers, etc.) demonstrate the considerable capabilities of a distributed intelligence smart grid system to solve complex optimization problems. In other words, because the operations/computing described herein can be distributed and shared across multiple processors and devices, the core hardware components may be modest. For example, in some embodiments, communication node C functionality may be provided by a virtual machine on any end device (rather than just a separate router box with telecommunications).

The communication node C may include core applications, such as CPU/memory/OS management applications, port/device drivers, router/Internet Protocol (IP) services, network management services, basic protocol support, SCADA, custom API/applications, and device security services. Moreover, the communication node C may include virtual applications, such as a virtual machine (e.g., a Java Virtual Machine), message bus(es), message broker(s), protocol adapters, mini-SCADA, open-standards API, and third-party applications (e.g., security/analytics applications). The core applications may use such software as C++/Linux, and the virtual applications may use such software as Java/Linux. Additionally, the virtual applications may use the application memory 172 and the application processor(s) 152.

Because the communication node C of FIG. 1E is interoperable with other communication nodes C and includes a modular hardware/software platform, the use of the communication nodes C allows a smart electric grid (e.g., the grid 100) to be deployed gradually as economics and technology allow. For example, a communication node C can be added when a meter is added to the grid 100, or when a street light is added to the grid 100.

Figure 1F:
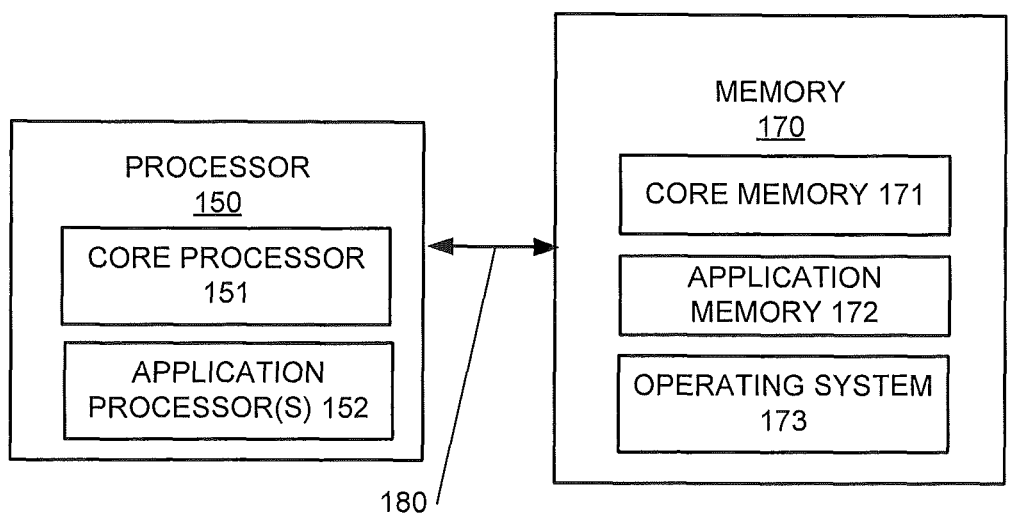
FIG. 1F is a block diagram that illustrates details of an example processor and memory that may be used in accordance with various embodiments.

Referring now to FIG. 1F, a block diagram is provided that illustrates details of an example processor 150 and memory 170 of a communication node C that may be used in accordance with various embodiments. The processor 150 communicates with the memory 170 via an address/data bus 180. The processor 150 may be, for example, a commercially available or custom microprocessor. Moreover, it will be understood that the processor may include multiple processors. The memory 170 is representative of the overall hierarchy of memory devices containing the software and data used to implement various functions of a communication node C as described herein. The memory 170 may include, but is not limited to, the following types of devices: cache, ROM, PROM, EPROM, EEPROM, flash, Static RAM (SRAM), and Dynamic RAM (DRAM).

As shown in FIG. 1F, the memory 170 may hold various categories of software and data, such as an operating system 173. The operating system 173 controls operations of a communication node C. In particular, the operating system 173 may manage the resources of the communication node C and may coordinate execution of various programs by the processor 150.

Referring again to FIGS. 1C and 1D, an electric grid device E may be, for example, an electric utility meter, a transformer, a light (e.g., a street light), an electric grid control device, an electric grid protection device, a line sensor, a weather sensor, an Advanced Metering Infrastructure (AMI) device, an analog or digital sensor connected to an electric utility asset, an electric generator, an electric turbine, an electric boiler, an electric vehicle, a home appliance, a battery storage device, a capacitor device, a solar power device, a smart generation device, an intelligent switching device, an emission monitoring device, or a voltage regulator. It will be understood that an electric grid device E described herein shall refer to any one of the electric grid devices $E_1$-$E_5$ described herein. Moreover, it will be understood that more than five electric grid devices E may be included in an electric grid 100. For example, dozens, hundreds, thousands, or more electric grid devices E may be included in the electric grid 100.

Similarly, a communication node C shall refer to any one of the communication nodes $C_1$ and $C_2$ described herein, and dozens, hundreds, thousands, or more communication nodes C may be included. In particular, it will be understood that a communication node C may communicate with a plurality of other communication nodes C via one or more field message buses described herein. Additionally, a head end system H shall refer to any one of the head end systems $H_1$-$H_3$ described herein, and dozens, hundreds, thousands, or more head end systems H may be included. Furthermore, a vendor V shall refer to any one of the vendors $V_1$-$V_3$ described herein, and dozens, hundreds, thousands, or more vendors V may be included.

Figure 2A:
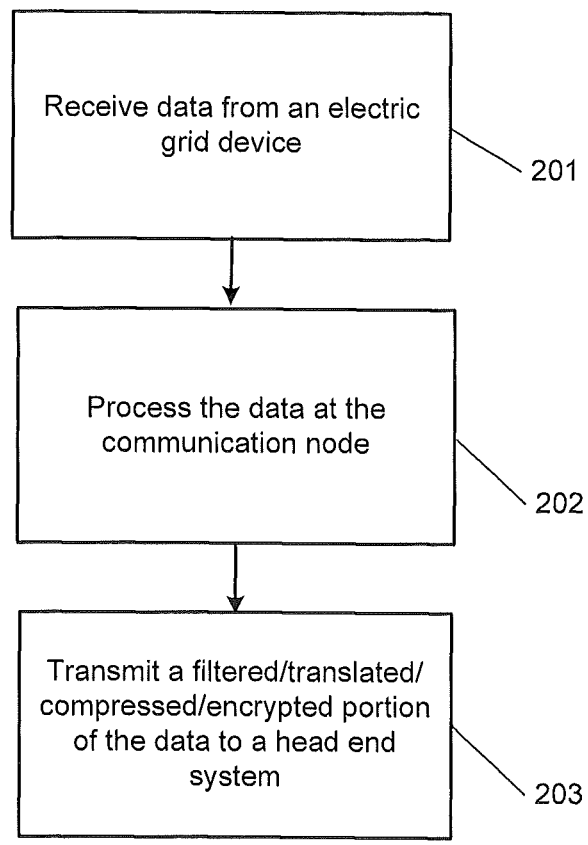
FIGS. 2A-2F are flowcharts illustrating operations of a communication node of FIGS. 1C-1F, according to various embodiments.

FIGS. 2A-2F are flowcharts illustrating operations of a communication node C of FIGS. 1C-1F, according to various embodiments. Referring now to FIG. 2A, operations of the communication node C may include receiving data (e.g., the data 191) from an electric grid device E via a network interface 160 (Block 201). In some embodiments, the network interface 160 may include a local area network interface, such as a WiFi, Ethernet, USB, or serial interface. The operations may also include processing the data from the electric grid device E at the communication node C (Block 202). Moreover, the operations may include transmitting a filtered portion of the data to an electric utility head end system H, after processing the data at the communication node C (Block 203). Additionally or alternatively, the operations may include processing the data from the electric grid device E at an upstream operational head end system H or another communication node C. Furthermore, it will be understood that operations of transmitting the filtered portion of the data may additionally or alternatively include transmitting a translated, compressed, and/or encrypted portion of the data to another communication node C. Similarly, it will be understood that the communication node C may receive filtered, translated, compressed, and/or encrypted data from another communication node C. Moreover, it will be understood that a virtual machine at the communication node C may be configured to decrypt encrypted filtered data (and/or encrypted raw data) received from another communication node C via the field message bus 140.

Figure 2B:
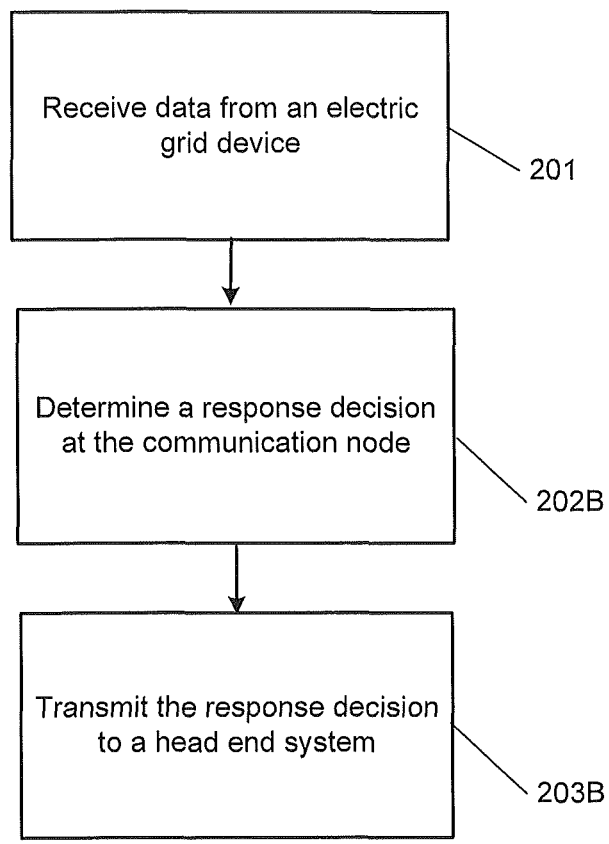

Referring now to FIG. 2B, operations of processing the data may include determining, at the communication node C, a response decision (e.g., a response 193/194) with respect to the electric grid device E that provides data 191 or with respect to another electric grid device E (Block 202B). For example, it will be understood that the response decision may provide a decision that can be used/implemented by an electric grid device $E_3$ having an event 190 and/or by another electric grid device E (such as an electric grid device $E_5$, or an electric grid device $E_4$ that provides the data 191 regarding the event 190). Moreover, transmitting the filtered portion of the data may include transmitting the response decision (and/or a status) to the electric utility head end system H (Block 203B).

Figure 2C:
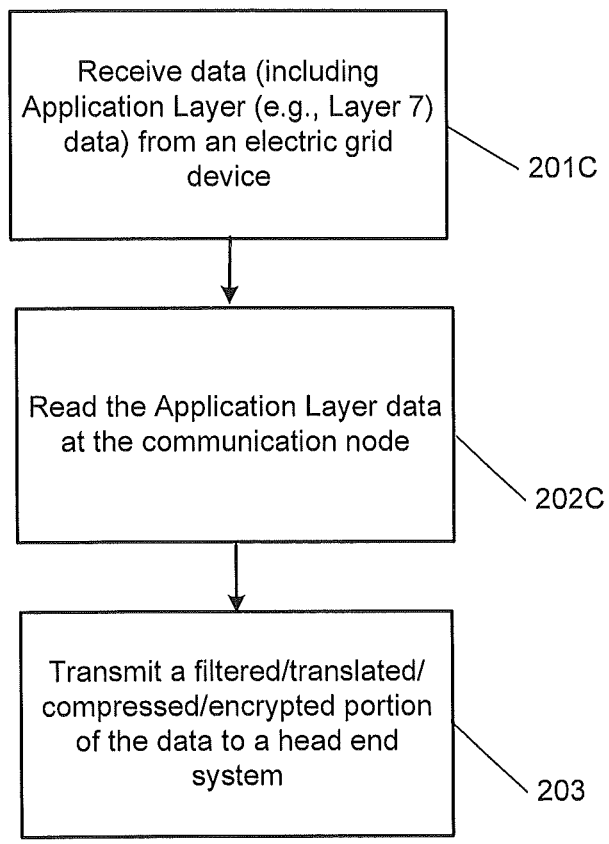

Referring now to FIG. 2C, operations of receiving data may include receiving Application Layer (e.g., Layer 7) data (Block 201C). Moreover, operations of processing the data may include reading the Application Layer data at the communication node C (Block 202C). Although the Application Layer data is described herein as one example, the inventive entity appreciates that operations of processing the data may include reading any logical layer data at the communication node C. For example, operations of processing the data may include reading data of any of Layers 3-7 of the Open Systems Interconnection (OSI) model at the communication node C. As another example, operations of processing the data may include reading Application Layer data of the Transmission Control Protocol (TCP)/Internet Protocol (IP) model at the communication node C.

Figure 2D:
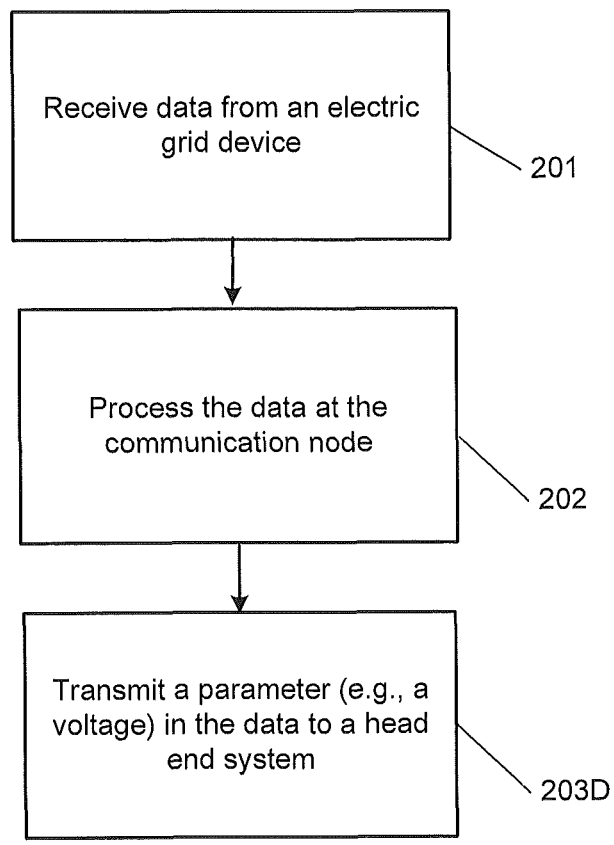

Referring now to FIG. 2D, operations of transmitting the filtered portion of the data received from the electric grid device E may include transmitting at least one parameter in the data to the electric utility head end system H (Block 203D). It will be understood that the particular electric grid device parameter(s) may depend on a specific use case. For example, the parameter may include an electric grid parameter (e.g., a voltage or a current), a networking parameter (e.g., a data transfer rate), a customer parameter (e.g., a willingness to participate in a program or service), a security parameter (e.g., a key), a device identification (ID) parameter, a time-stamp parameter, or an event notification (e.g., an alarm/alert).

Figure 2E:
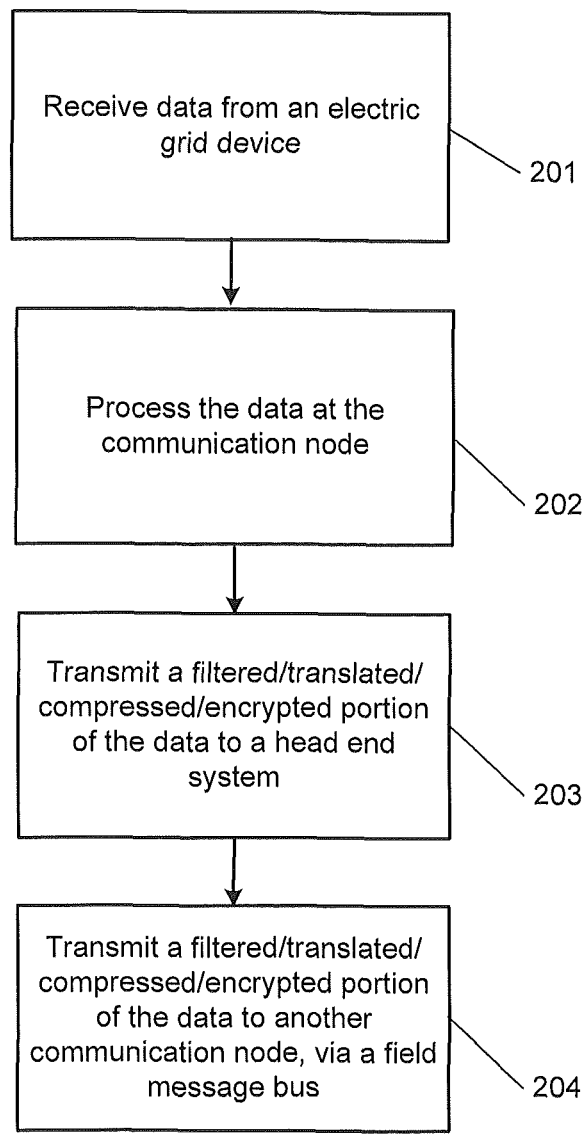

Referring now to FIGS. 2E and 1C, the communication node C may be a first communication node $C_1$ corresponding to a first electric grid device $E_1$. Moreover, operations of the communication node $C_1$ may include transmitting the filtered portion of the data to a second communication node $C_2$ corresponding to a second electric grid device $E_4$, via a field message bus 140 (Block 204).

Figure 2F:
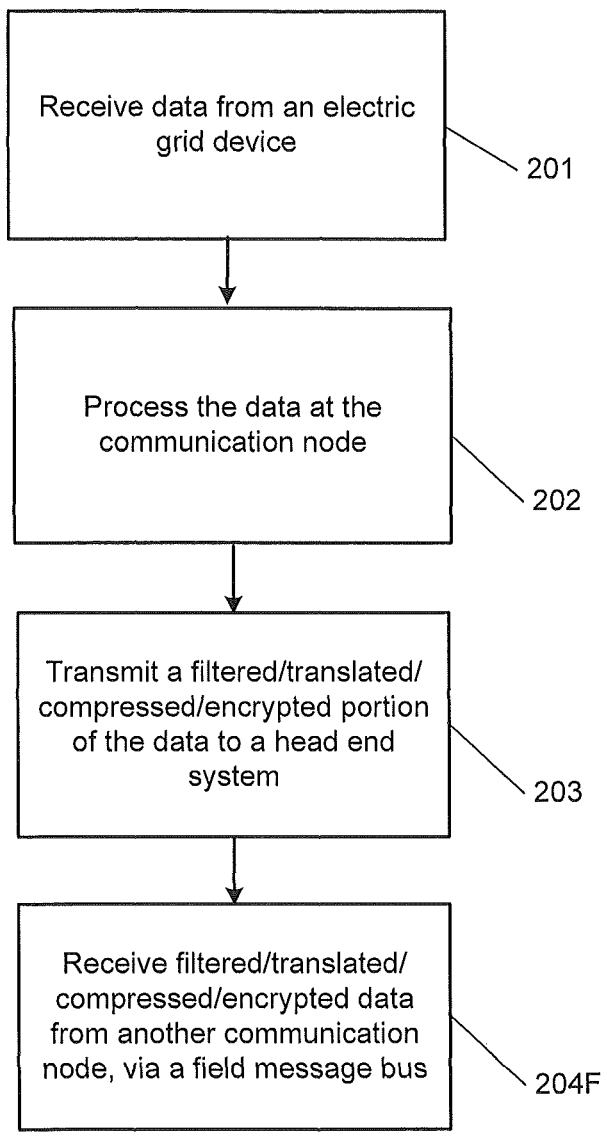

Referring now to FIGS. 2F and 1C, the communication node C may be a first communication node $C_1$ corresponding to a first electric grid device $E_1$. Moreover, operations of the communication node C may include receiving filtered, translated, compressed, and/or encrypted data from a second communication node $C_2$ corresponding to a second electric grid device $E_4$, via a field message bus 140 (Block 204F). For example, encrypted data may be communicated between communication nodes C, using a field message bus 140 of a field area network. Accordingly, reading data from the field message bus 140 may require a key to decrypt the data. Referring still to FIGS. 2E and 2F, it will be understood that the first and second communication nodes $C_1$ and $C_2$ may correspond to different first and second vendors V, respectively. Accordingly, various operations described herein may be performed between devices/nodes of different vendors V. Additionally or alternatively, various operations described herein may be performed between devices/nodes of the same vendor V. For example, in some embodiments, the first and second communication nodes $C_1$ and $C_2$ may correspond to the same vendor V.

Figure 3A:
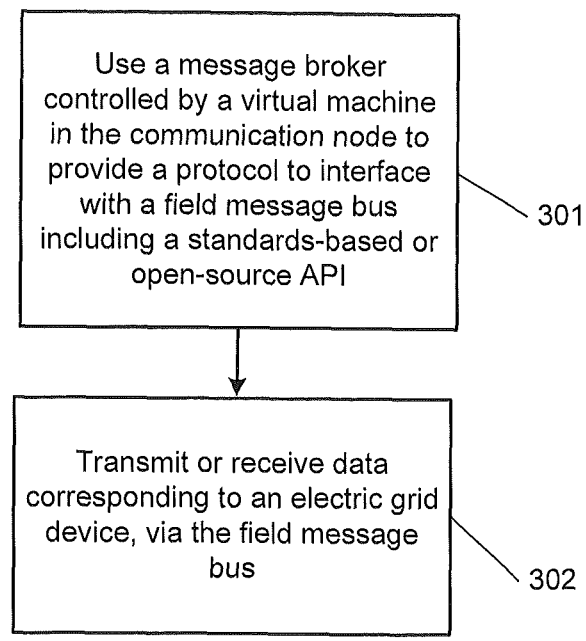
FIGS. 3A-3F are flowcharts illustrating operations of a communication node of FIGS. 1C-1F, according to various embodiments.

FIGS. 3A-3F are flowcharts illustrating operations of a communication node C of FIGS. 1C-1F, according to various embodiments. Referring now to FIG. 3A, operations of a communication node C may include using a message broker that is controlled by a virtual machine in the communication node C to provide a protocol to interface with a field message bus 140 including a standards-based (e.g., a standard such as DNP, Microsoft Windows, etc.) or open-source Application Programming Interface (API) (Block 301). In other words, the broker may be running on the virtual machine inside the communication node C. Moreover, it will be understood that application software of the communication node C may be written in any programming language supported by the agnostic message protocol used by the field message bus 140. Operations of the communication node C may also include transmitting or receiving data (e.g., the data 191) corresponding to an electric grid device E, via the field message bus 140 (Block 302). Moreover, it will be understood that the operations illustrated in Block 302 of FIG. 3A may occur before and/or after the operations illustrated in Block 301.

In some embodiments, the virtual machine described with respect to Block 301 of FIG. 3A may provide virtual telemetry that translates and shares the data 191. Without such virtual telemetry, the communication node C would send the data 191 to a head end system H, which would be a slower and encrypted process. Accordingly, the virtual machine provides a way to run the virtual telemetry and to interoperate between devices (e.g., between different communication nodes C).

Figure 3B:
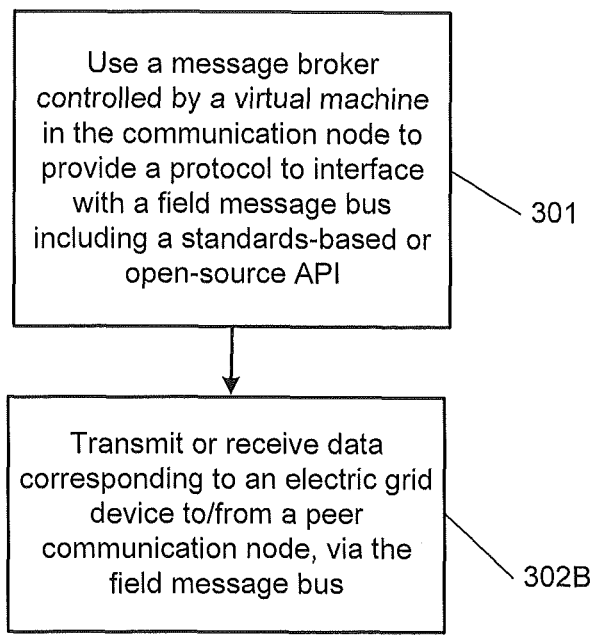

Referring now to FIG. 3B, the communication node C may be a first communication node $C_1$ and the field message bus 140 may interface with a second communication node $C_2$. Moreover, the first and second communication nodes $C_1$ and $C_2$ may be respective peer communication nodes that have the field message bus 140 therebetween. Accordingly, transmitting/receiving the data may include transmitting/receiving the data corresponding to an electric grid device E to/from a peer communication node via the field message bus 140 (Block 302B). The peer communication nodes can communicate using the field message bus 140 even if the peer communication nodes use different carriers (e.g., different cellular carriers) because the field message bus 140 allows peer-to-peer communications between carriers. In some embodiments, the first and second communication nodes $C_1$ and $C_2$ may correspond to different first and second vendors V, respectively. Moreover, in some embodiments, the first and second communication nodes $C_1$ and $C_2$ may have a parent-child hierarchical arrangement, with the field message bus 140 between the first and second communication nodes $C_1$ and $C_2$. Additionally or alternatively, communications between the first and second communication nodes $C_1$ and $C_2$ may use a plurality of communication methods. For example, the first communication node $C_1$ may send data to the second communication node $C_2$ via a first communication method (e.g., one of WiFi, cellular, PLC, etc.) and receive data from the second communication node $C_2$ via a second communication method (e.g., a different one of WiFi, cellular, PLC, etc.).

Figure 3C:
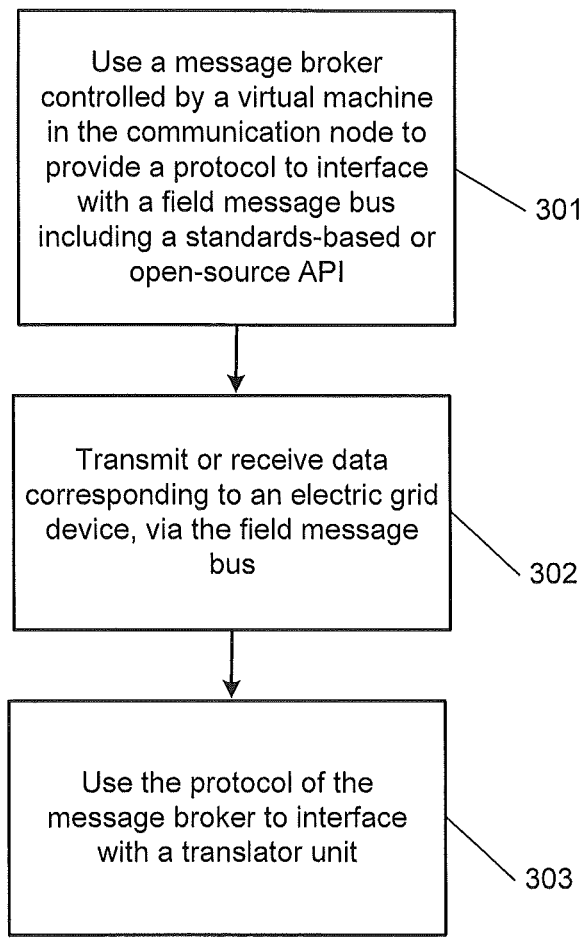

Referring now to FIG. 3C, operations of the communication node C may include using the protocol of the message broker (and/or a message client) to interface with a translator unit that is between a device protocol and the field message bus 140 (Block 303). Moreover, it will be understood that the translator unit can be embedded in an electric grid device E, a hardware interface of a communication node C, a central processing unit, or a virtual machine. For example, an electric grid device E having such a translator unit therein may therefore publish data directly to the field message bus 140 (e.g., without using a communication node C to publish data). It will also be understood that the device protocol (e.g., an end point protocol such as DNP, Modbus, SNMP, etc.) may be on an electric grid device E, the communication node C, and/or a head end system H.

Figure 3D:
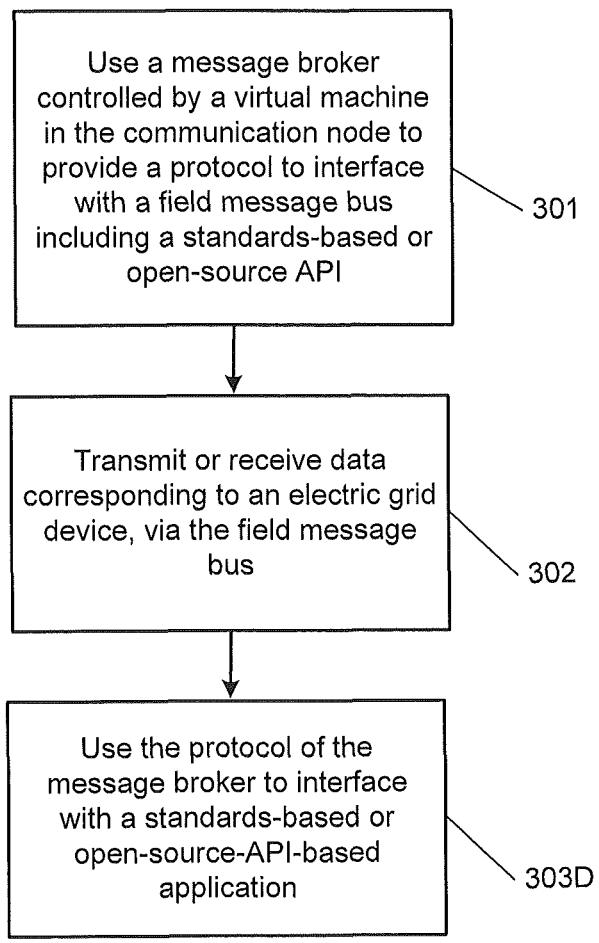

Referring now to FIG. 3D, operations of the communication node C may include using the protocol of the message broker to interface with a standards-based or open-source-API-based application in the communication node C (Block 303D).

Figure 3E:
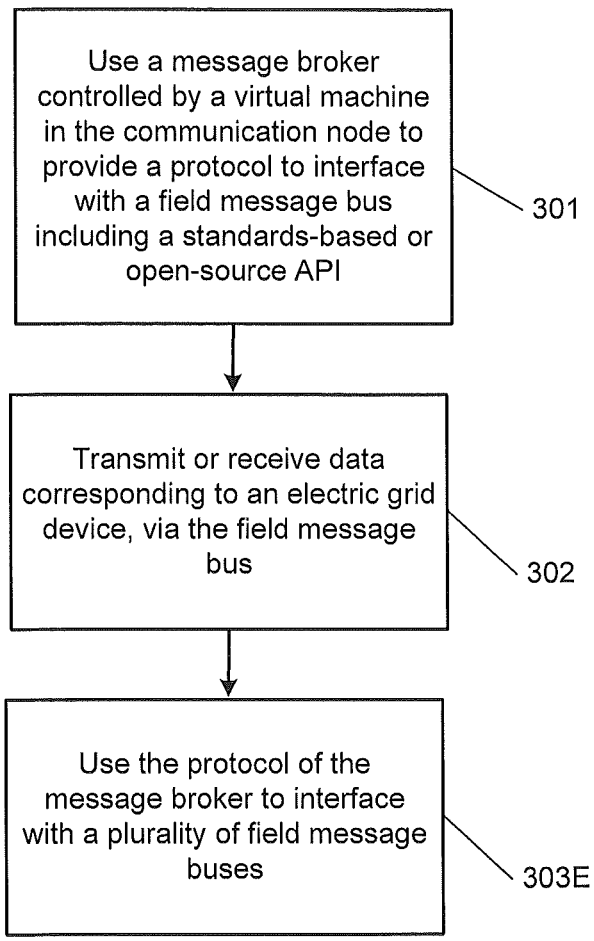

Referring now to FIG. 3E, operations of the communication node C may include using the protocol of the message broker to interface with a plurality of field message buses (Block 303E). In other words, the message bus 140 may be one among a plurality of field message buses with which the communication node C may interface.

Figure 3F:
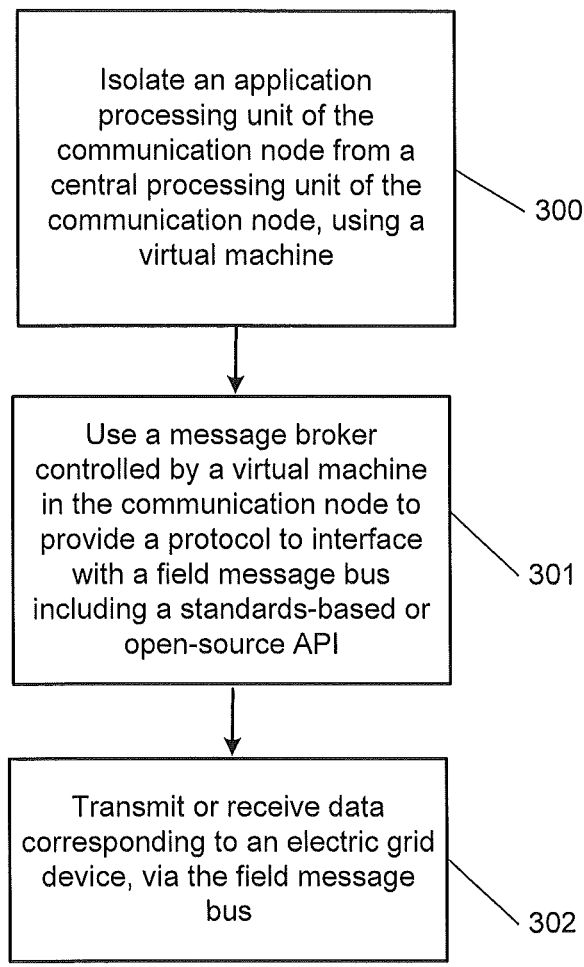

Referring now to FIG. 3F, operations of the communication node C may include isolating an application processing unit (e.g., the application processor 152) of the communication node C from a central processing unit (e.g., the core processor 151) of the communication node C, using the virtual machine (Block 300). For example, the virtual machine may provide a virtual firewall between the application processor 152 and the core processor 151, thus increasing security. As a result of the virtual firewall, a particular communication node C may be quarantined from the field message bus 140 without losing the entire network of communication nodes C. For example, the field message bus 140 can compress and provide secure access to a field area network that does not exist for a public cellular carrier or heterogeneous (public & private) network in which a firewall boundary only exists at a data center, and not at a substation or close to electric grid devices E. This distributed architecture, employing the field message bus 140, may extend the boundary of a corporate firewall to a substation that has a virtual LAN and it can do this on any telecom WAN medium (e.g., including wired or wireless mediums). Moreover, it will be understood that the operations illustrated in Block 300 may be performed before and/or after the operations illustrated in Block 301. Additionally or alternatively, it will be understood that the virtual machine may operate using the application processor(s) 152 or a partition of the central processing unit of the communication node C.

Figure 4:
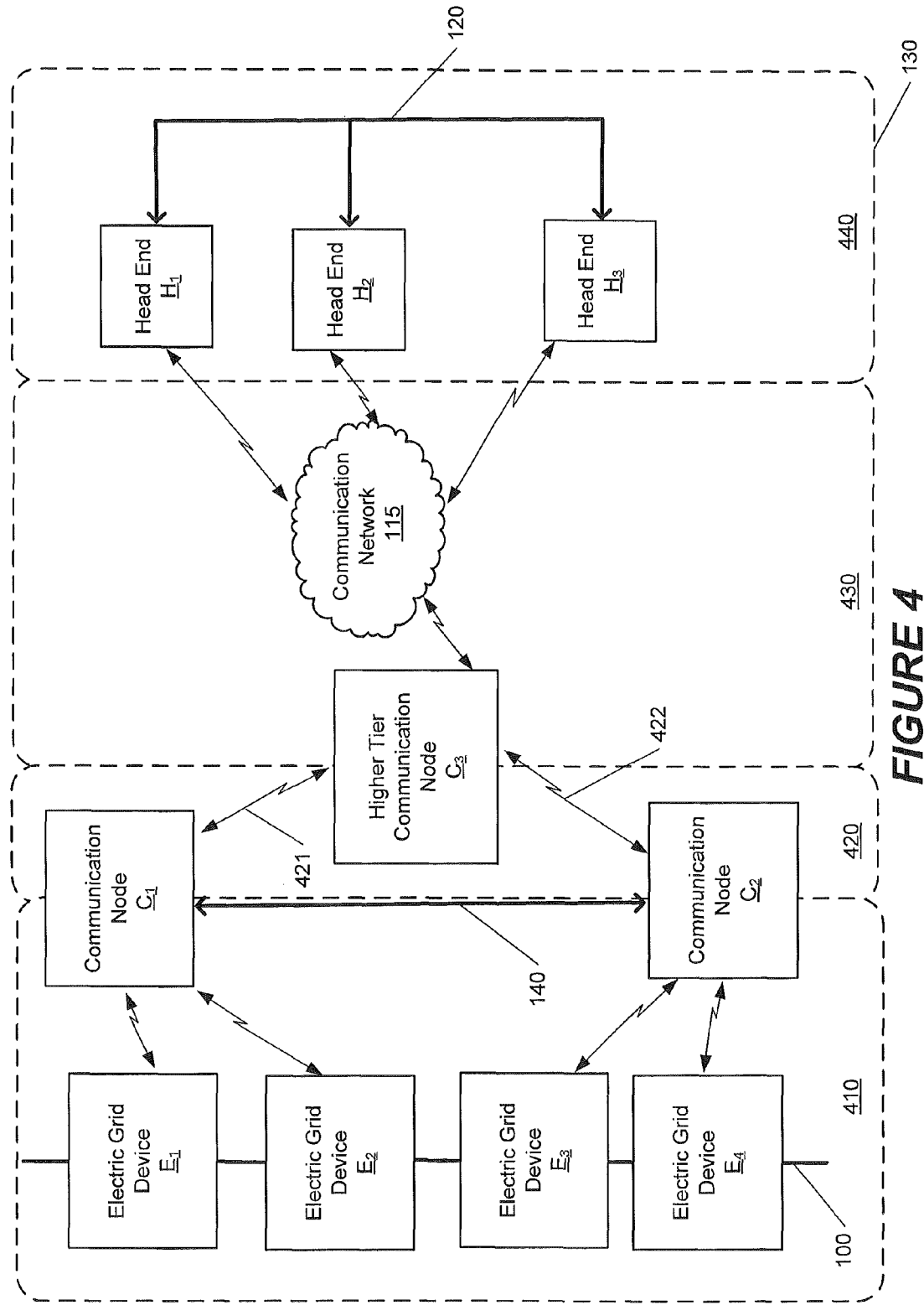
FIGS. 4 and 5 are schematic illustrations of various networks linking electric grid devices, communication nodes, and electric utility data center head end systems, according to various embodiments.
Figure 5:
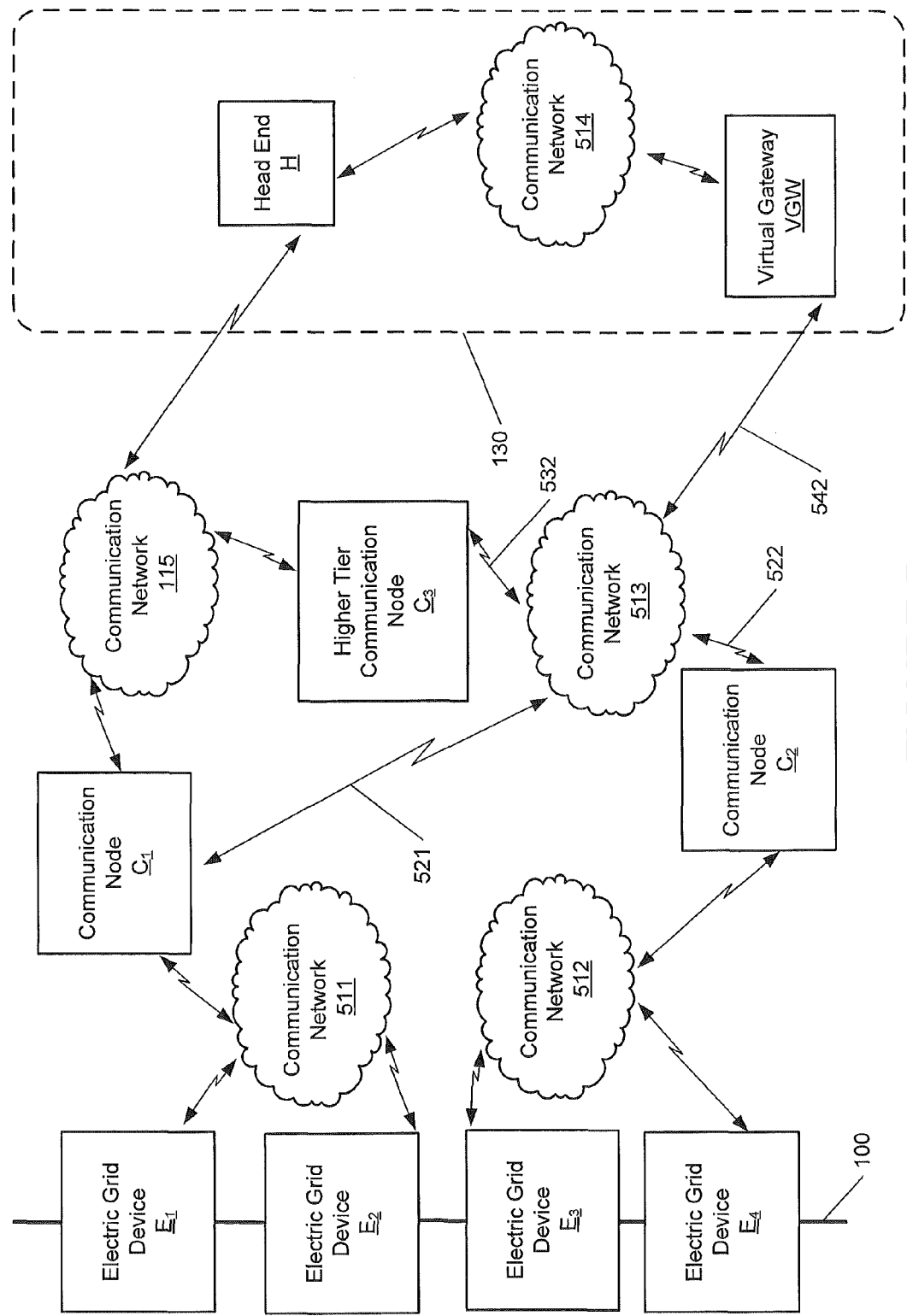

FIGS. 4 and 5 are schematic illustrations of various networks linking electric grid devices E, communication nodes C, and electric utility data center head end systems H, according to various embodiments. Referring now, to FIG. 4, a Local Area Network (LAN) 410, a Field Area Network (FAN) 420, a Wide Area Network (WAN) 430, and a corporate private network 440 are illustrated. For example, the LAN 410 may include a first LAN for communications between electric grid devices $E_1$, $E_2$ and communication node $C_1$, and a second LAN for communications between electric grid devices $E_3$, $E_4$ and communication node $C_2$.

The FAN 420 may provide communications between the communication nodes $C_1$, $C_2$ via a field message bus 140. Moreover, multiple tiers of communication nodes C may be provided. For example, the communication nodes $C_1$, $C_2$ may be lowest-tier, edge communication nodes, whereas a higher-tier communication node $C_3$ may be between the communication nodes $C_1$, $C_2$ and the corporate private network 440 (which is at the electric utility data center 130). As an example, the communication nodes $C_1$, $C_2$ may be feeder communication nodes C, whereas the higher-tier communication node $C_3$ may be at a substation. In some embodiments, the higher-tier communication node $C_3$ may manage the communication nodes $C_1$, $C_2$. Additionally or alternatively, another communication node C may manage the higher-tier communication node $C_3$. In other words, the other communication node C may be in an even higher tier/level of hierarchy than the higher-tier communication node $C_3$ and may communicate with the higher-tier communication node $C_3$ using peer-to-peer communications. Accordingly, referring still to FIG. 4, it will be understood that additional tiers may be provided, as well as that additional peer communication nodes C may be included in the tiers.

The FAN 420 may provide communications between the, communication node $C_1$ and the higher-tier communication node $C_3$ via a field message bus 421, and may provide communications between the communication node $C_2$ and the higher-tier communication node $C_3$ via a field message bus 422. It will be understood that the block diagram of a communication node C in FIG. 1E may apply to the higher-tier communication node $C_3$, as well as the communication nodes $C_1$, $C_2$.

The WAN 430 may include a communication network 115 that communicates with the corporate private network 440 via a network router that is between the communication network 115 and the head end systems $H_1$-$H_3$. In some embodiments, the communication network 115 may be a Virtual Private Network (VPN). Moreover, it will be understood that one or more additional communication networks may be provided between the higher-tier communication node $C_3$ and the electric utility data center 130. For example, multiple vendors V may have respective communication networks between the higher-tier communication node $C_3$ and an even-higher-tier/level communication node C.

Referring now to FIG. 5, a communication network 511 may provide communications between electric grid devices $E_1$, $E_2$ and communication node $C_1$, and a communication network 512 may provide communications between electric grid devices $E_3$, $E_4$ and communication node $C_2$. The communication networks 511, 512 may each be local area networks. For example, the communication networks 511, 512 may be local area networks in the LAN 410 illustrated in FIG. 4. In some embodiments, a given communication node C may use a plurality of local area networks. Moreover, it will be understood that the communication networks 511, 512 may use a message bus (e.g., a local field message bus) that continuously pulls data from electric grid devices E and filters out data that is not helpful/useful, thus increasing data processing speed in comparison with processing all data at an electric utility data center 130. In other words, a local message bus on a communication node C may perform real-time data streaming, and may do so while using the same or different bus for global sharing between other communication nodes that also are running a local message bus.

A field message bus 521 may provide communications between the communication node $C_1$ and communication network 513. Moreover, a field message bus 522 may provide communications between the communication node $C_2$ and the communication network 513. Also, field message buses 532, 542 may provide communications between the communication network 513 and a higher-tier communication node $C_3$ and a virtual gateway VGW at the electric utility data center 130, respectively.

It will be understood that the communication network 513 may provide a field area network. Multiple vendors V may be connected to the same communication network 513, which may be a cellular network or a WiFi network, among other wireless or wired networks. Additionally, the communication network 513 may communicate Layer 7 data that can be read/understood by the communication nodes C.

The electric utility data center 130 may include a communication network 514. For example, the communication network 514 at the electric utility data center 130 may include a corporate private network, such as the corporate private network 440 illustrated in FIG. 4.

Figure 6:
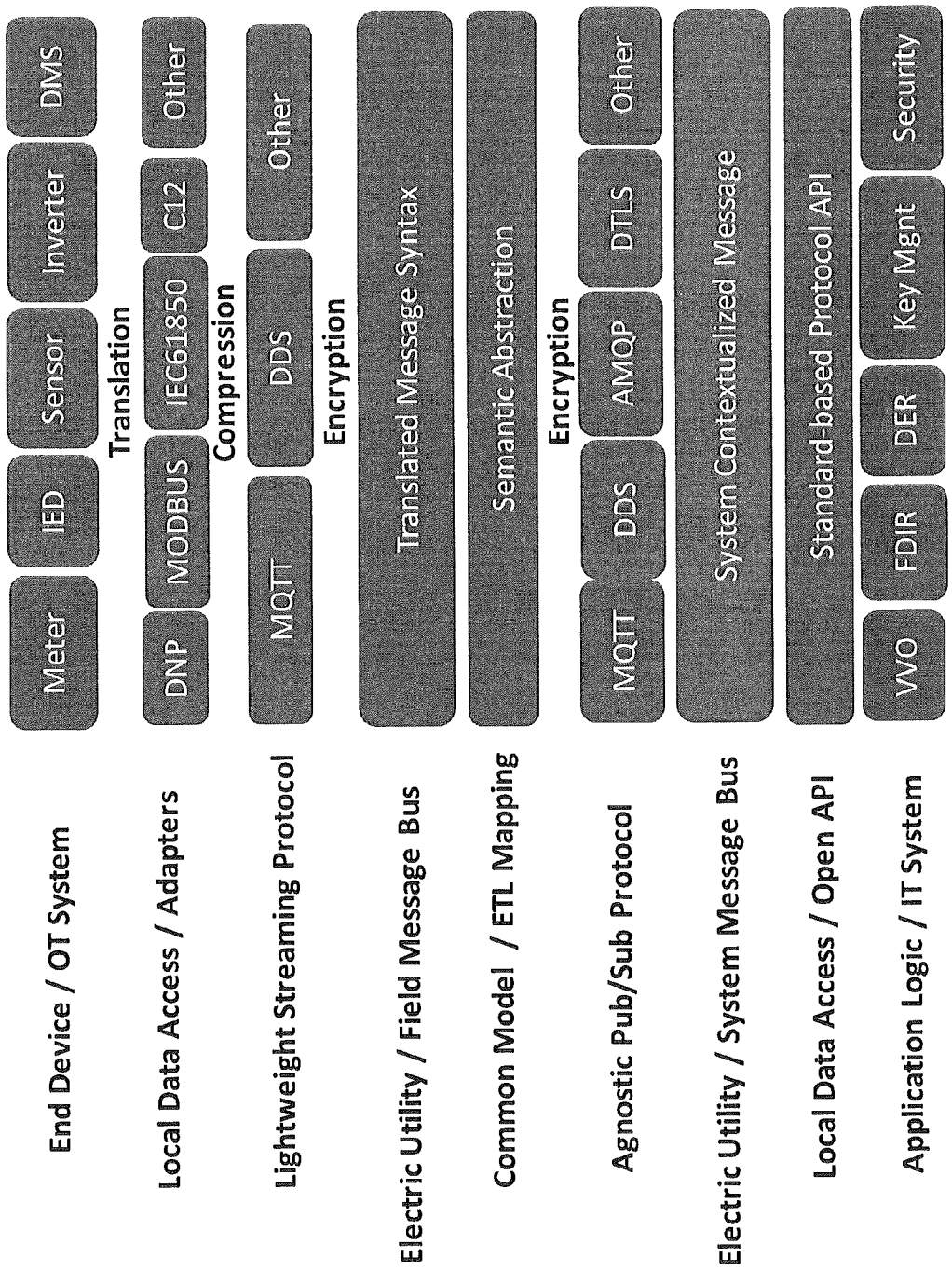
FIGS. 6 and 7 illustrate block diagrams of field message bus data models, according to various embodiments.

Referring now to FIG. 6, a block diagram of a field message bus data model is illustrated, according to various embodiments. The field message bus data model may include vendor V components, as well as electric utility components and standards-based or open-source components. For example, FIG. 6 illustrates that a vendor V's end device/OT system may include a meter, an IED, a sensor, an inverter, and/or a DMS. Moreover, a vendor V's application logic/IT system may include VVO, Fault Detection, Isolation and Recovery/Restoration (FDIR), DER, security key management (Mgnt), and/or security.

Referring still to FIG. 6, an electric utility/system message bus may include/provide a system-contextualized message. Moreover, the electric utility's local data access/ adapters may include DNP, Modbus, or IEC61850 adapters, or C12, among others. Additionally, the field message bus data model illustrated in FIG. 6 may include data compression and encryption.

The field message bus data model illustrated in FIG. 6 may also include various standards-based or open-source components. For example, a standards-based or open-source lightweight streaming broker may include MQTT, AMQP, Data Distribution Service (DDS), and/or other messaging protocols. An electric utility/field message bus may include translated message syntax. A standards-based or open-source common model/Extract, Transform and Load (ETL) mapping may include/provide semantic abstraction. A standards-based or open-source agnostic publish/subscribe protocol may include MQTT, DDS, AMQP, Datagram Transport Layer Security (DTLS), and/or other messaging protocols. Moreover, a standards-based or open-source local data access/open API may be a standards-based protocol API.

Figure 7:
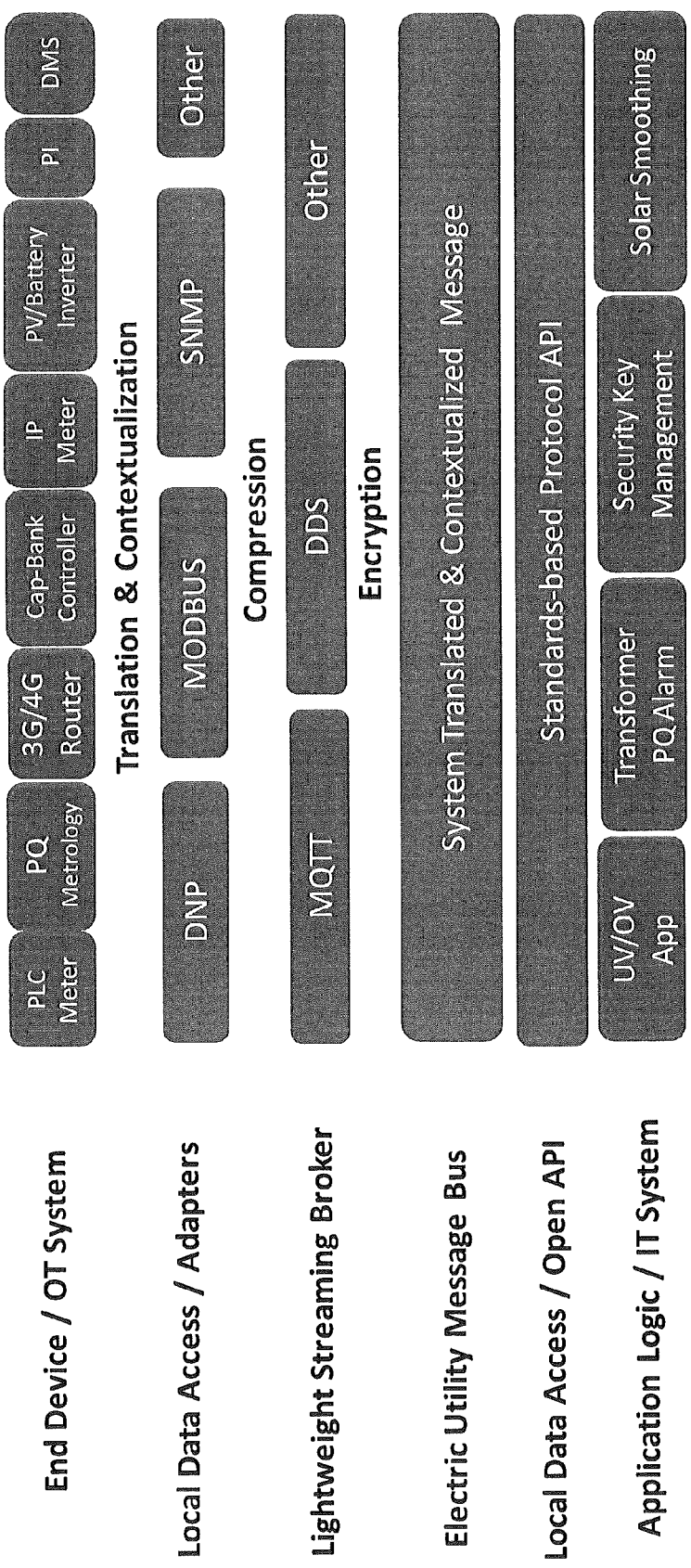

Referring now to FIG. 7, another example of a block diagram of a field message bus data model is illustrated, according to various embodiments. The field message bus data model may include vendor V components, as well as electric utility components and standards-based or open-source components. For example, FIG. 7 illustrates that a vendor V's end device/OT system may include a PLC meter, Power Quality (PQ) Metrology, a 3G/4G router, a Capacitor (Cap) Bank Controller, an IP-enabled meter, a PV/battery inverter, a PI system, and/or a DMS. Moreover, a vendor V's application logic/IT system may include an Undervoltage (UV)/Overvoltage (OV) Application (App), a transformer PQ alarm, security key management, and/or solar smoothing.

Referring still to FIG. 7, an electric utility's message bus may include/provide a system translated and contextualized message. Moreover, the electric utility's local data access/ adapters may include DNP/Modbus/Simple Network Management Protocol (SNMP) protocol adapters, among others. Additionally, the field message bus data model illustrated in FIG. 7 may include data compression and encryption.

The field message bus data model illustrated in FIG. 7 may also include various standards-based or open-source components. For example, a standards-based or open-source lightweight streaming broker may include MQTT, DDS, and/or AMQP. Moreover, a standards-based or open-source local data access/open API may include a standards-based protocol API.

Figure 8:
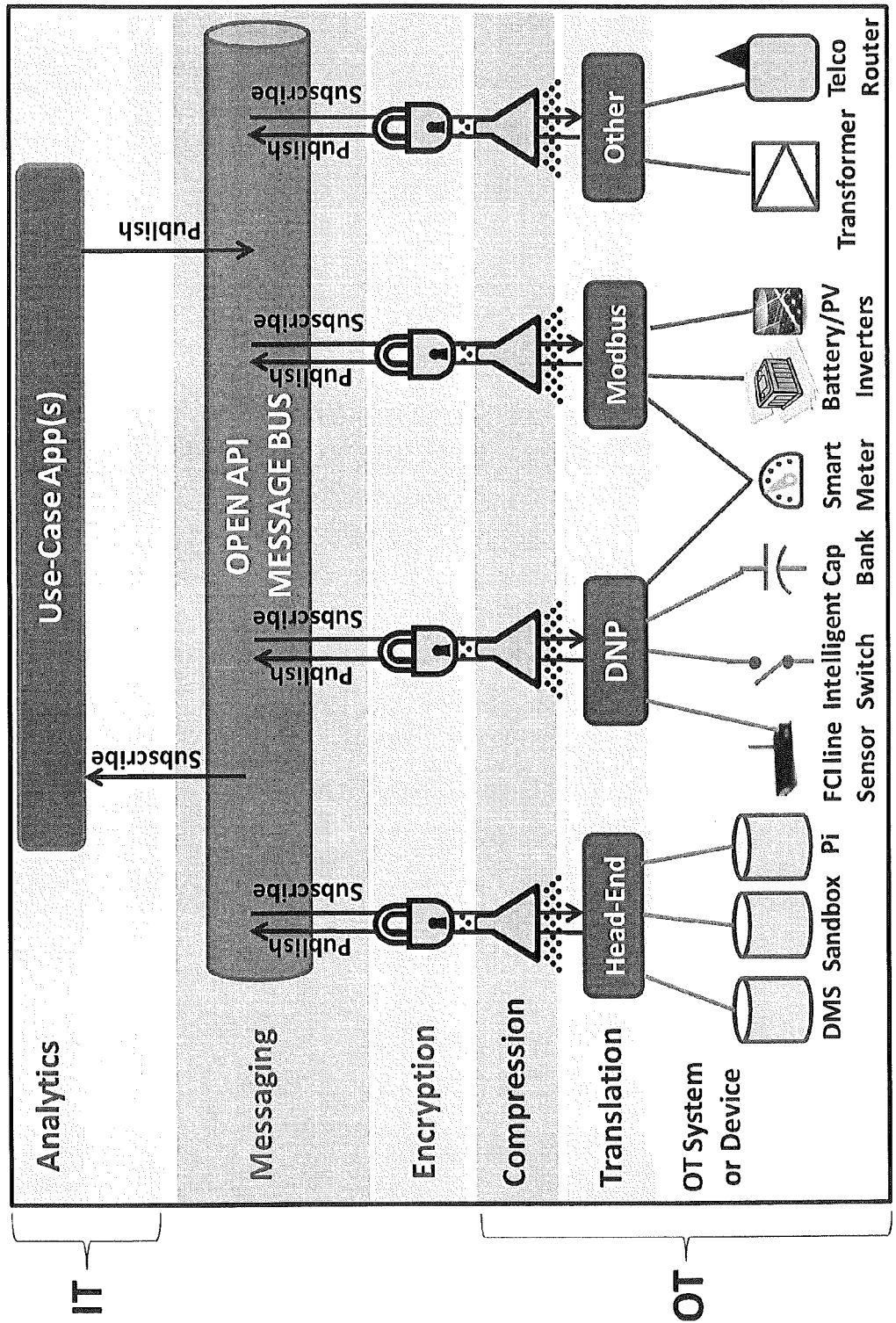
FIG. 8 illustrates a schematic diagram of how a field message bus helps converge Information Technology (IT), telecommunications (Telecom) activities, and Operational Technology (OT), according to various embodiments.

Referring now to FIG. 8, a schematic diagram illustrates how a field message bus helps converge IT, telecommunications (Telecom) activities, and OT, according to various embodiments. For example, IT may include analytics, such as one or more use-case applications (App(s)) in a communication node C. The use-case application(s) may subscribe to data from an open API message bus (e.g., the field message bus 140) and/or may publish data to the open API message bus.

Referring still to FIG. 8, OT may include translation components, such as a head end, DNP, Modbus, and/or SNMP, and such translation components may subscribe to data from the open API message bus and/or may publish data to the open API message bus. Moreover, data between the translation components and the open API message bus may be encrypted and/or compressed, as illustrated in FIG. 8. Additionally, OT may include OT system or device components, such as a DMS, sandbox, Pi system, line sensor, intelligent switch, capacitor (Cap) bank, smart meter, battery/PV inverter(s), transformer, and/or telecommunication (Telco) router. For example, the DMS, sandbox, and Pi system may be located at a data center 130, and may communicate with the open API message bus via a head end system H, whereas the line sensor, intelligent switch, capacitor (Cap) bank, smart meter, battery/PV inverter(s), transformer, and telecommunication (Telco) router may be electric grid devices E that communicate with the open API message bus via one or more communication nodes C. The communication node(s) C may communicate with the open API message bus using translation/messaging protocols such as those illustrated in FIG. 8.

Figure 9:
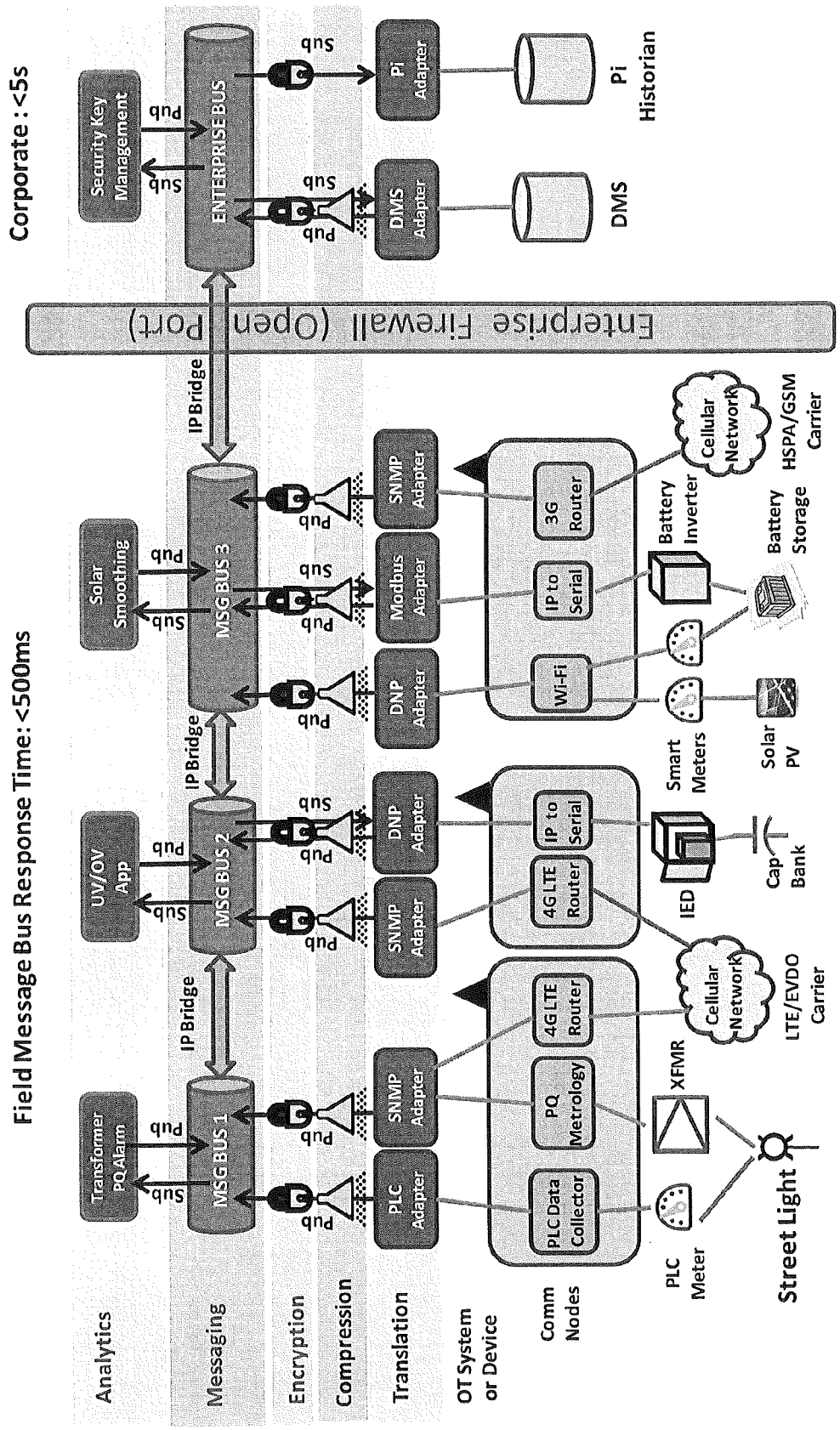
FIG. 9 illustrates a schematic diagram of additional details of the schematic diagram illustrated in FIG. 8, according to various embodiments.

Referring now to FIG. 9, a schematic diagram illustrates additional details of the schematic diagram illustrated in FIG. 8, according to various embodiments. Moreover, FIG. 9 illustrates a comparison between a response time of a field message bus (less than about 500 milliseconds (ms)) and a corporate/enterprise bus (about 5 seconds). Additionally, it will be understood that MSG BUSES 1-3 in FIG. 9 may be three different field message buses that provide pub/sub with analytics and/or translation. It will also be understood that the Comm Nodes illustrated in FIG. 9 may be communication nodes C, and that the OT system/device components illustrated in FIG. 9 as being communicatively coupled to the communication nodes C may be electric grid devices E. Furthermore, the XFMR illustrated in FIG. 9 may be a transformer, and the cellular networks may include LTE/ Evolution-Data Optimized (EVDO) carrier and High Speed Packet Access (HSPA)/Global System for Mobile Communications (GSM) carrier networks.

Accordingly, in view of various embodiments described herein, a field message bus (e.g., a message bus 140 in the field rather than within an electric utility data center 130) may enable interoperability between utility grid assets (e.g., electric grid devices E). For example, a communication node C may be on/attached to an electric utility pole. By using the field message bus, sharing and processing of data will occur closer to the utility grid assets (rather than at the electric utility data center 130). The field message bus and its supporting logic may reside on the communication node C's application processing unit(s) (e.g., application processor(s) 152).

In particular, a field message bus may be a standards-based or open-source Application Programming Interface (API), and a virtual machine may be inside a communication node C and may isolate the communication node C's application processing unit(s) from a Central Processing Unit (CPU) (e.g., the core processor 151). Specifically, a message broker may run on the virtual machine that is inside the communication node C.

The message broker may provide a protocol to interface between different message buses and/or different communication nodes C. The message broker's protocol also may interface with an adapter (e.g., a translator between a device protocol and a message bus) and applications (e.g., applications based on a standards-based or open-source API). Accordingly, the message broker may enable interoperability between utility grid assets.

Also, instead of relying on an electric utility data center 130 to read/understand Application Layer (e.g., Layer 7) data, a communication node C in the field and using a field message bus can read/understand such Layer 7 data. Moreover, this field message bus technology may seamlessly integrate with existing communication nodes C without disrupting present hardware/software functions. For example, this field message bus technology may be agnostic to the communication medium (e.g., could be used with cellular communications or with PLC communications, etc.), agnostic to the hardware/vendor, agnostic to the software language (e.g., could be used with Java, C++, Python, etc.), and agnostic to the Transport Layer.

Moreover, it will be understood that the functionality of a communication node C described herein may be incorporated into any device with a processor, a memory, and a network interface. For example, the functionality of a communication node C described herein may be incorporated into a device corresponding to a utility grid (e.g., an electric grid device E or a device corresponding to a gas or water grid). Accordingly, although a communication node C may perform various operations described herein, it will be understood that one or more other devices may perform the operations.

Figure 10A:
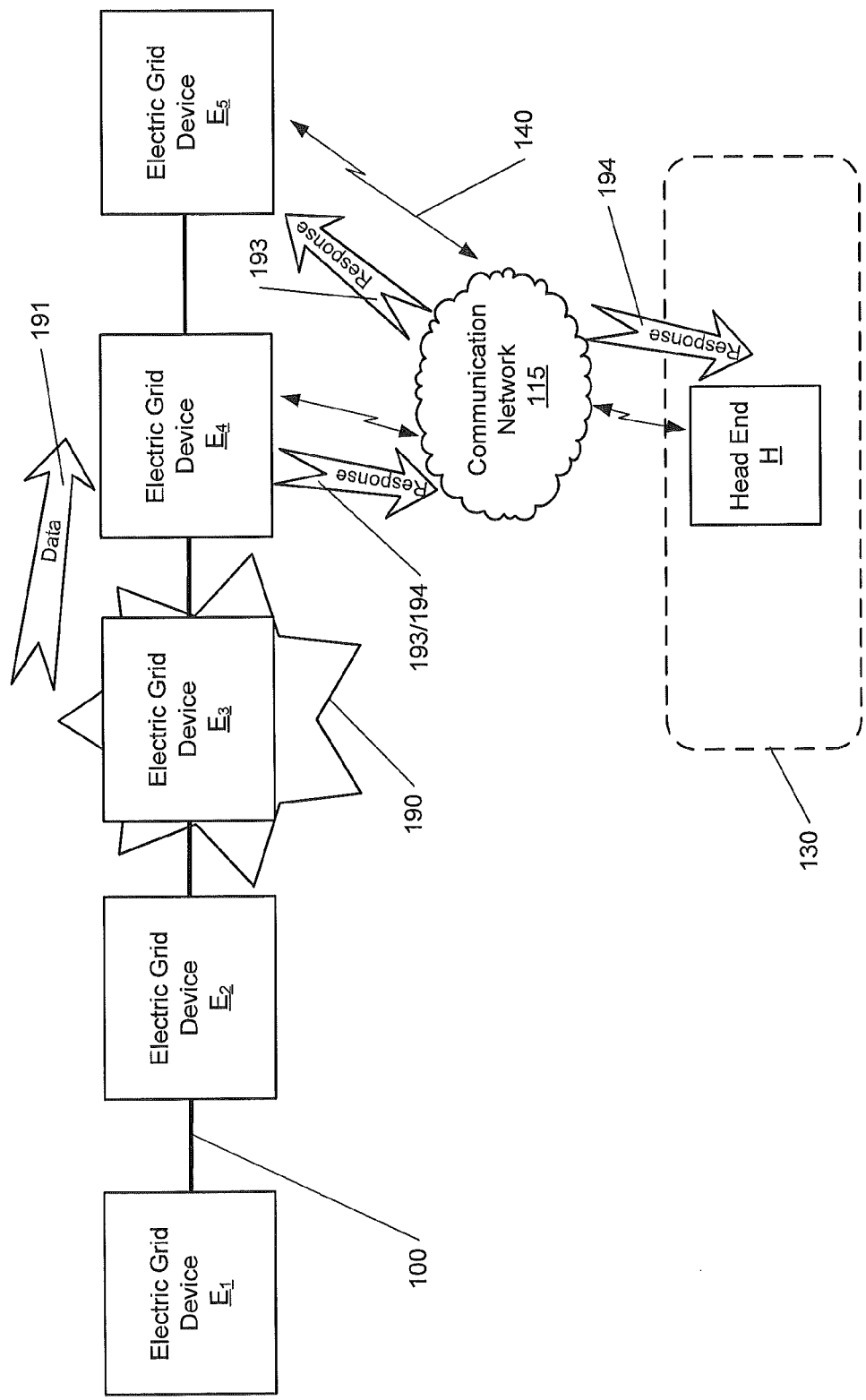
FIGS. 10A-10C are schematic illustrations of determining a response to an event regarding an electric grid device, according to various embodiments.
Figure 10B:
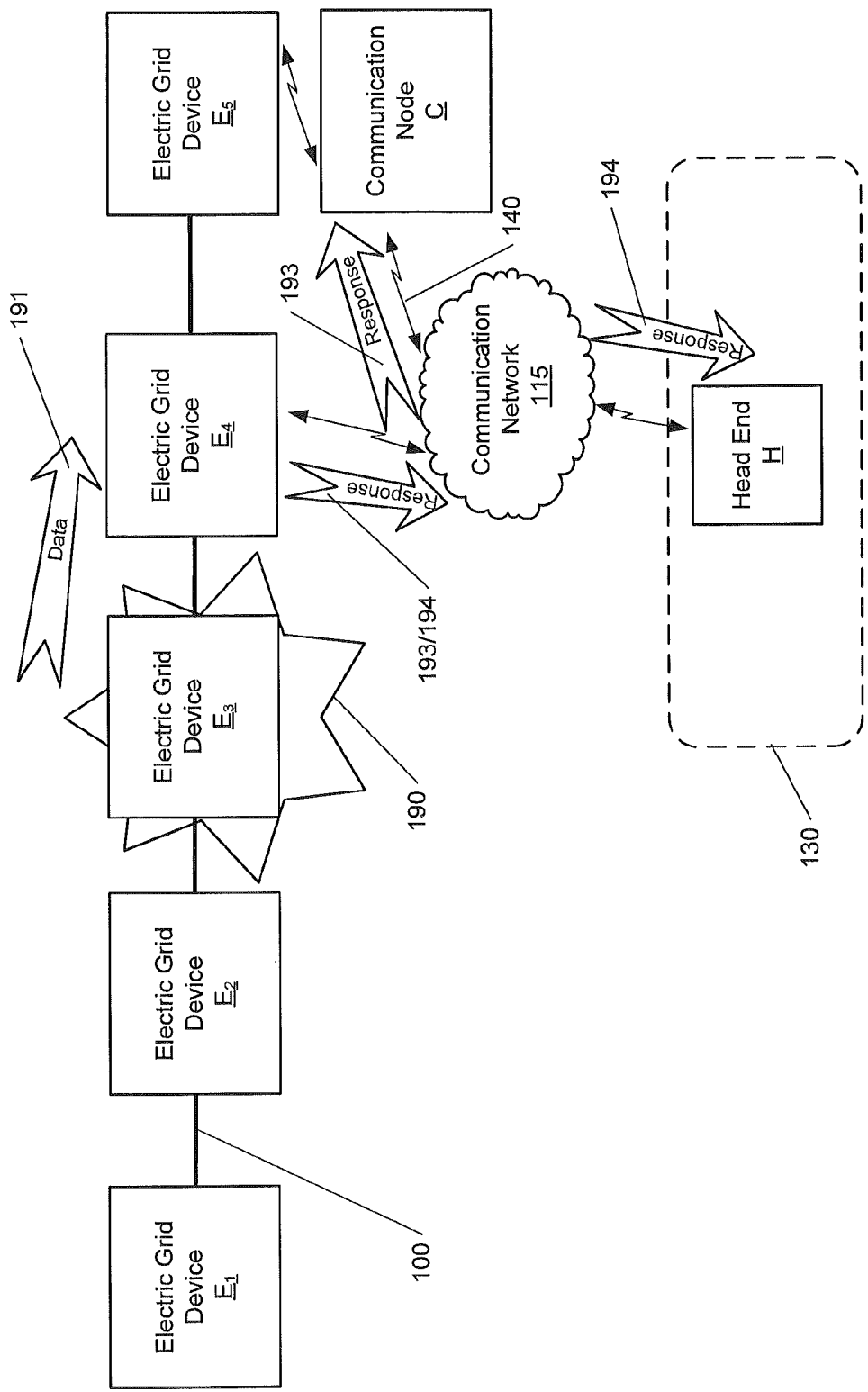
Figure 10C:
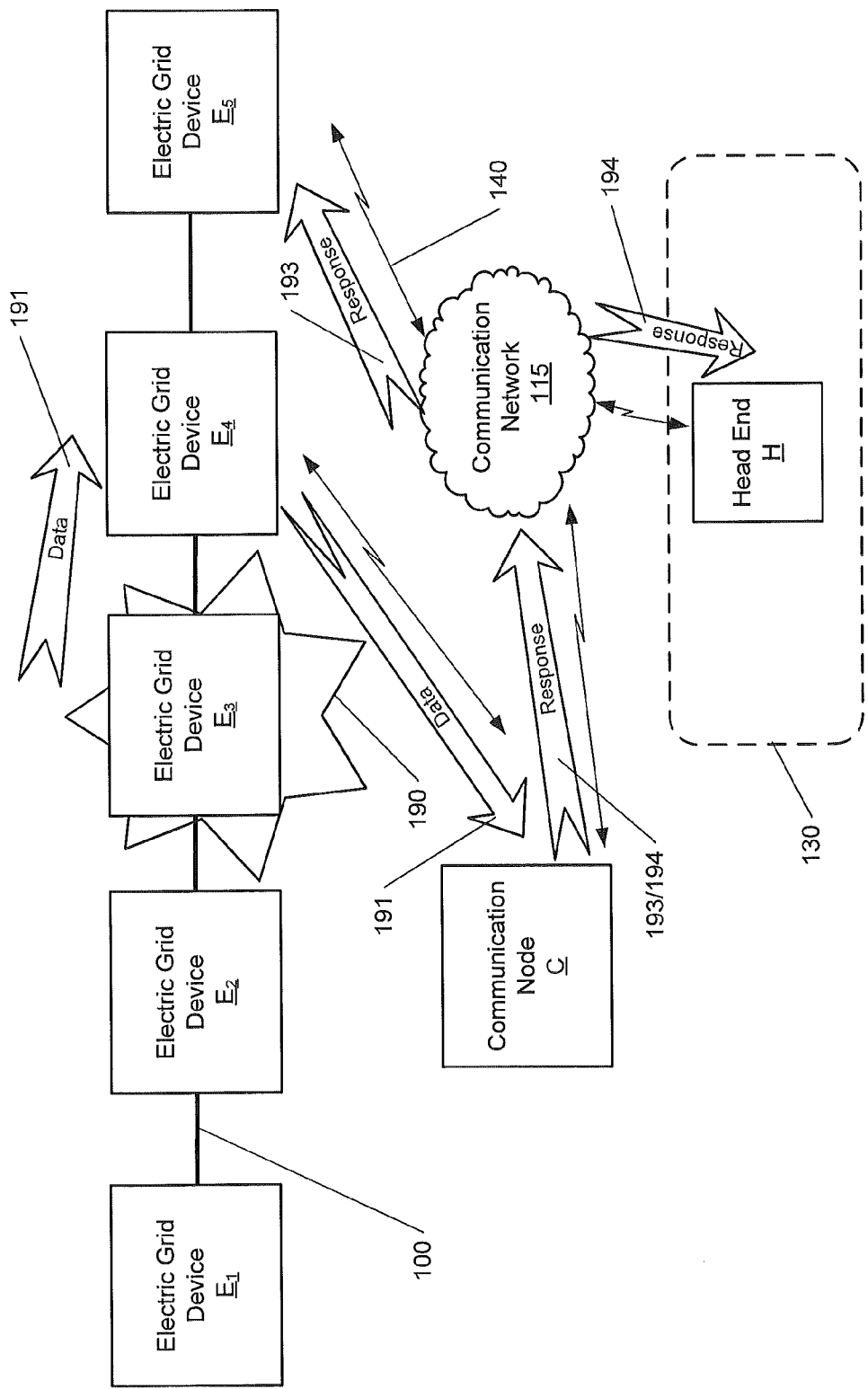

FIGS. 10A-10C are schematic illustrations of determining a response to an event regarding an electric grid device, according to various embodiments. Referring now to FIG. 10A, a schematic illustration is provided of determining a response 193/194, at an electric grid device $E_4$, to an event 190 regarding an electric grid device $E_3$, according to various embodiments. In contrast with determining a centralized response 192 at the electric utility data center 130, as illustrated in FIG. 1B, the distributed-decision-making approach illustrated in FIG. 10A of determining the response 193/194 at the electric grid device $E_4$ may significantly improve decision/response times, reduce outage times, and reduce system operating costs. For example, the centralized response 192 illustrated in FIG. 1B may take longer than fifteen minutes, whereas the distributed response 193/194 illustrated in FIG. 10A may take less than one second. Moreover, it will be understood that a distributed approach, as described herein, may refer to a multi-tier, connected network in which an application may be at one level/tier of the network and inputs may be local to an electric grid device E at a different level/tier. In other words, hardware, software, and telecommunications can be at any level/tier of the network.

Moreover, various embodiments described herein may provide interoperability and interchangeability of hardware and software with Virtual LAN (VLAN) routers connected to a higher tier node's message bus.

Referring still to FIG. 10A, the electric grid device $E_4$ may transmit the response 193/194 to both the electric utility data center 130 and one or more of the other electric grid devices $E_1$-$E_3$ and $E_5$ (e.g., via the field message bus 140). In other words, the response 193 illustrated in FIG. 10A may include the same content/data as the response 194, but may have a different destination. Moreover, a DMS of the electric utility data center 130 may update a model of the electric grid 100 responsive to receiving the response 194. As the distributed-decision-making approach in FIG. 10A occurs at one of the electric grid devices $E_1$- $E_5$ and reduces the burden on the electric utility data center 130, it may significantly improve decision/response times, reduce outage times, and reduce system operating costs.

Referring now to FIG. 10B, a schematic illustration is provided of determining a response 193/194, at an electric grid device $E_4$, to an event 190 regarding an electric grid device $E_3$, according to various embodiments. In particular, FIG. 10B is a modification of FIG. 10A that illustrates transmitting the response 193 to the electric grid device $E_5$ via a communication node C corresponding to the electric grid device $E_5$. In other words, FIG. 10B illustrates that the electric grid device $E_4$ may transmit the response 193/194 to both the electric utility data center 130 and one or more of the other electric grid devices $E_1$-$E_3$ and $E_5$ (e.g., via the field message bus 140 and the communication node C).

Referring now to FIG. 10C, a schematic illustration is provided of determining a response 193/194, at a communication node C, to an event 190 regarding an electric grid device $E_3$, according to various embodiments. In particular, FIG. 10C is a modification of FIG. 10A that illustrates determining the response 193/194 at the communication node C (instead of at the electric grid device $E_4$) and transmitting the response 193 from the communication node C to the electric grid device $E_5$ (without using an intervening communication node C between the electric grid device $E_5$ and the transmitting communication node C illustrated in FIG. 10C). In other words, FIG. 10C illustrates that the communication node C may directly transmit the response 193/194 to both the electric utility data center 130 and one or more of the other electric grid devices $E_1$-$E_3$ and $E_5$ (e.g., via the field message bus 140).

FIGS. 10A-10C provide examples illustrating that the functionality of a communication node C described herein may be incorporated into an electric grid device E that includes a processor, a memory, and a network interface. Moreover, it will be understood that although electric grid devices E are illustrated in FIGS. 10A-10C, other devices corresponding to a utility grid, such as devices corresponding to a gas grid or a water grid, may perform the operations of a communication node C if the devices include a processor, a memory, and a network interface.

FIGS. 11A-11D are flowcharts illustrating operations of a first device corresponding to a gas, water, or electric grid, according to various embodiments. For example, the operations may be performed in the electric grid device $E_4$ illustrated in FIGS. 10A and 10B. Alternatively, the operations may be performed in the communication node C illustrated in FIG. 10C, or in a device corresponding to a water grid or a device corresponding to a gas grid.

Figure 11A:
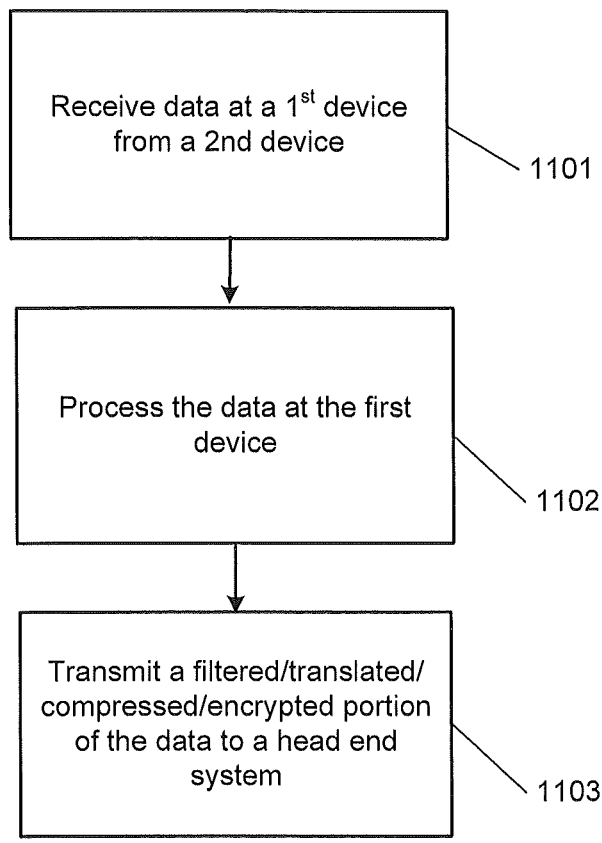
FIGS. 11A-11D are flowcharts illustrating operations of a device corresponding to a gas, water, or electric grid, according to various embodiments.

Referring now to FIG. 11A, operations of the first device may include receiving data (e.g., the data 191) from a second device (e.g., the electric grid device $E_3$) via a network interface (Block 1101). It will be understood that the second device may correspond to the same gas, water, or electric grid as the first device. Moreover, the network interface may include the functionality/components of the network interface 160 illustrated in FIG. 1E. For example, the network interface may include a local area network interface or a wide area network interface.

Referring still to FIG. 11A, the operations may also include processing the data from the second device at the first device (Block 1102). Additionally, the operations may include transmitting a filtered portion of the data to a data center (e.g., the electric utility data center 130) including an utility head end system H corresponding to the gas, water, or electric grid, after processing the data at the first device (Block 1103). Alternatively, in some embodiments, the operations of Block 1103 may include transmitting the filtered portion of the data to a third device in the field instead of to an utility head end system H of a data center. In particular, in some embodiments, the functionality of the head end system H may be incorporated into the third device that is in the field, thus reducing the need for an utility head end system H at a data center.

Figure 11B:
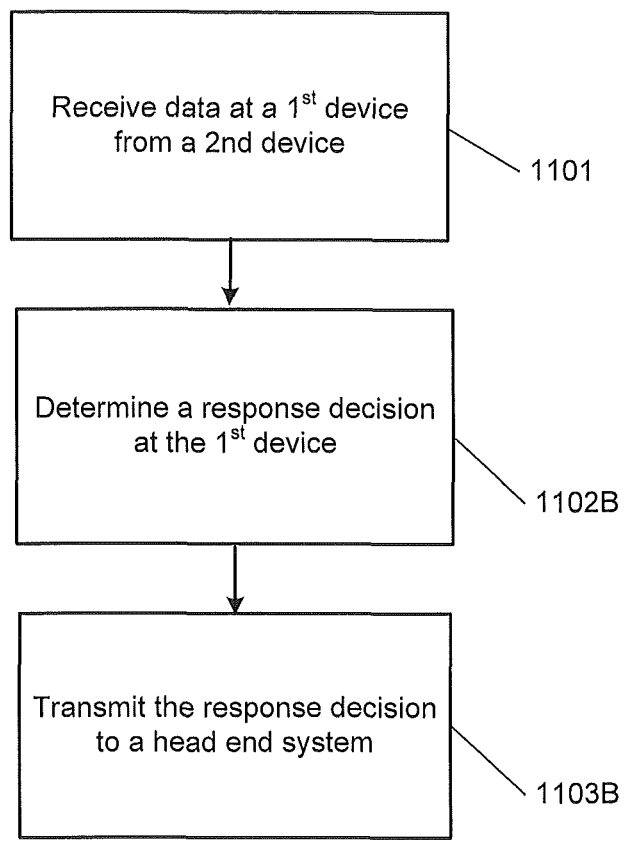
Figure 11C:
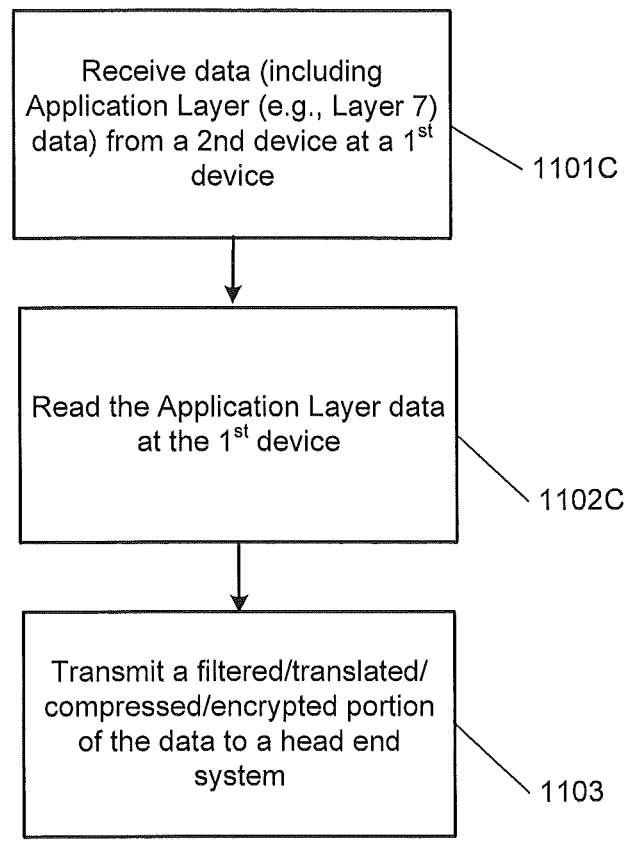

Referring now to FIG. 11B, operations of processing the data may include determining, at the first device, a response decision (e.g., a response 193/194) with respect to the data received from the second device. (Block 1102B). For example, it will be understood that the response decision may provide a decision that can be used/implemented by the second device and/or by another device. As an example, the response decision may be a response to an event (e.g., an event 190) at the second device or at a third device corresponding to the gas, water, or electric grid. Moreover, transmitting the filtered portion of the data may include transmitting the response decision (and/or a status) to the electric utility head end system H (Block 1103B).

Referring now to FIG. 11 C, operations of receiving data may include receiving Application Layer (e.g., Layer 7) data (Block 1101C). Moreover, operations of processing the data may include reading the Application Layer data at the first device (Block 1102C).

Figure 11D:
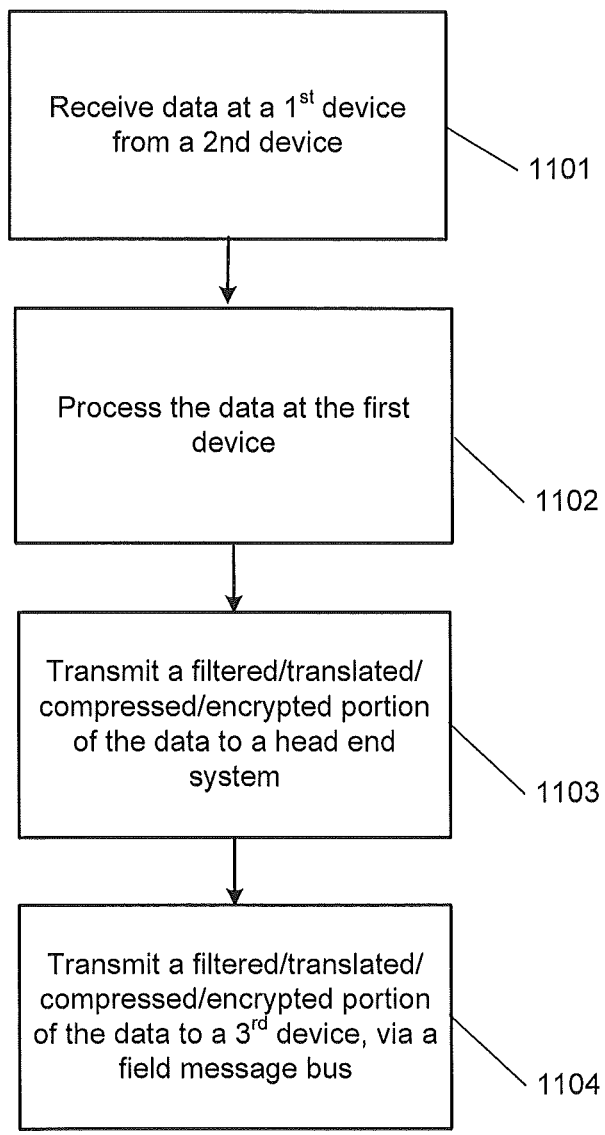

Referring now to FIG. 11D, operations of the first device may include transmitting the filtered portion of the data and/or the response decision to a third device corresponding to the gas, water, or electric grid, via a field message bus 140 (Block 1104).

Moreover, it will be understood that the filtered portion of the data, illustrated in Blocks 1103 and 1104, may include at least one electric grid parameter, water grid parameter, gas grid parameter, networking parameter, customer parameter, security parameter, device identification parameter, or timestamp parameter. In some embodiments, the first device may be an electric grid device, a water grid device, a gas grid device, a telecommunications system device, a server, or a home appliance. Additionally or alternatively, the first and second devices may correspond to different first and second vendors, respectively.

In some embodiments, the utility head end system H may be configured to provide communications via a data center message bus (e.g., the data center message bus 120). Moreover, operations of the first device may include transmitting the filtered portion of the data to a third device corresponding to the gas, water, or electric grid, via a field message bus 140 that is configured to provide communications independently of the data center message bus.

Figure 12A:
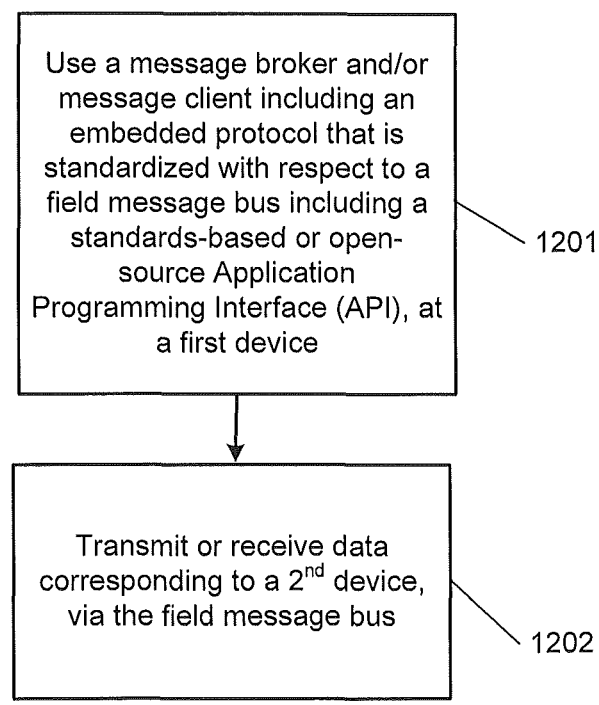
FIGS. 12A-12C are flowcharts illustrating operations of a device corresponding to a gas, water, or electric grid, according to various embodiments.
Figure 12B:
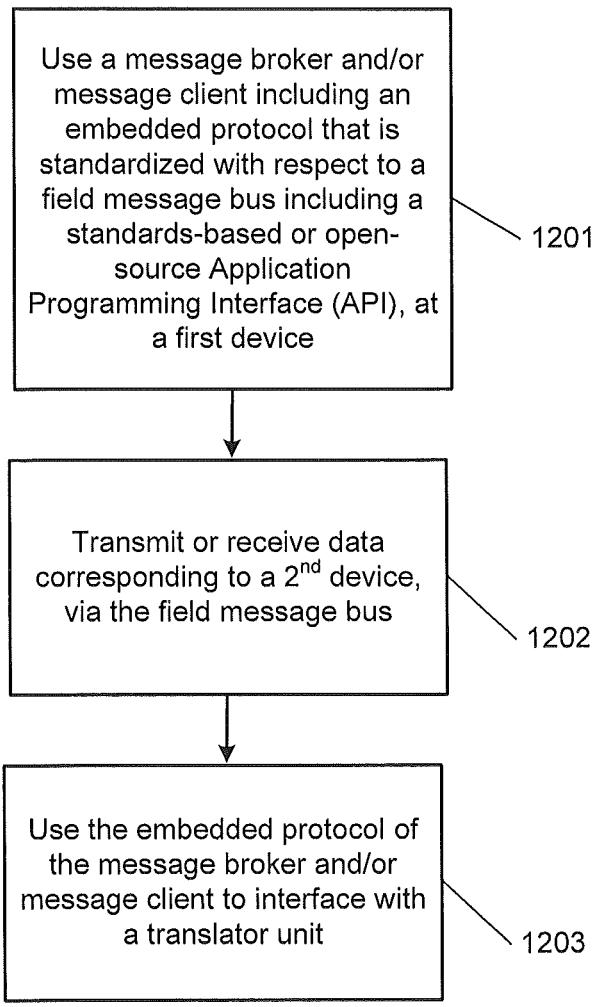
Figure 12C:
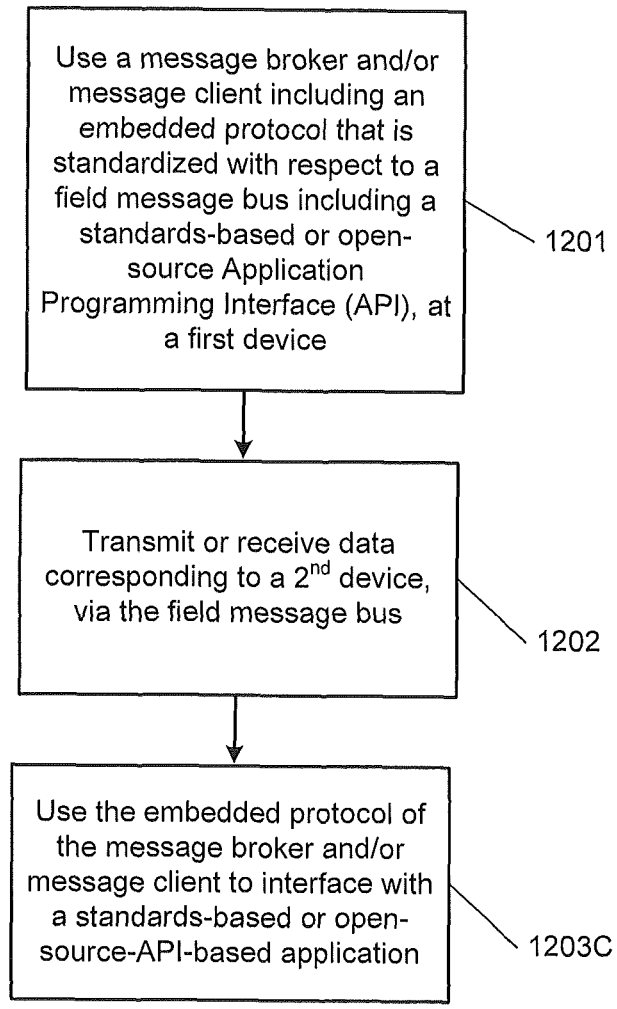

FIGS. 12A-12C are flowcharts illustrating operations of a first device corresponding to a gas, water, or electric grid, according to various embodiments. For example, the operations may be performed in an electric grid device E, a communication node C, or a device corresponding to a water grid or a gas grid. Moreover, it will be understood that the operations in FIGS. 12A-12C may be performed without using a virtual machine. Instead of using a virtual machine, the operations may include using a message broker and/or message client that includes an embedded protocol that is standardized with respect to a field message bus 140. In other words, virtualization (e.g., virtualization of transport, translation, and API to separate physical, logical, and network/telecommunications layers) may occur using a message broker and/or message client rather than a virtual machine.

Referring now to FIG. 12A, operations of the first device may include using a message broker and/or message client including an embedded protocol that is standardized with respect to a field message bus 140 that includes a standards-based or open-source Application Programming Interface (API), at the first device (Block 1201). Additionally, operations of the first device may include transmitting or receiving data corresponding to a second device that corresponds to the gas, water, or electric grid, via the field message bus (Block 1202). The first device may be spaced apart from a data center (e.g., an electric utility data center 130) that includes an utility head end system H. Moreover, the field message bus 140 may be configured to provide communications independently of a data center message bus (e.g., the data center message bus 120) of the utility head end system H.

Referring now to FIG. 12B, operations of the first device may include using the embedded protocol of the message broker and/or the message client to interface with a translator unit that is between a device protocol and the field message bus 140 (Block 1203).

Referring now to FIG. 12C, operations of the first device may include using the embedded protocol of the message broker and/or the message client to interface with a standards-based or open-source-API-based application in the first device (Block 1203C).

In some embodiments, operations of the first device indicated with respect to FIGS. 12A-12C may include using the embedded protocol of the message broker and/or the message client to interface with a plurality of field message buses (e.g., one or more field message buses in addition to the field message bus 140). Moreover, it will be understood that the first and second devices indicated with respect to FIGS. 12A-12C may correspond to different first and second vendors, respectively.

In some embodiments, a first device indicated with respect to FIGS. 11A-11D and 12A-12C may include a network interface that is configured to provide communications with a second device, via a field message bus 140 that includes a standards-based or open-source Application Programming Interface (API). For example, the network interface may include the functionality/components of the network interface 160 illustrated in FIG. 1E. As an example, the network interface may include a local area network interface or a wide area network interface configured to provide communications with the second device. In some embodiments, the network interface may be configured to provide communications with a plurality of devices corresponding to the gas, water, or electric grid.

In some embodiments, the network interface may be configured to receive data from the second device via the network interface. Moreover, the processor may be configured to process the data from the second device at the first device, and to control transmission of a filtered portion of the data to the utility head end system H after processing the data at the first device. The filtered portion of the data received from the second device may include, for example, at least one electric grid parameter, water grid parameter, gas grid parameter, networking parameter, customer parameter, security parameter, device identification parameter, or timestamp parameter.

The first device may also include a processor that is configured to control a message broker and/or message client in the first device. For example, the processor may include the functionality/components of the processor 150 illustrated in FIG. 1E. Moreover, the message broker and/or message client may include an embedded protocol that is standardized with respect to the field message bus 140. In some embodiments, the embedded protocol of the message broker and/or message client may be configured to interface with a translator unit that is between a device protocol and the field message bus 140. Additionally or alternatively, the embedded protocol of the message broker and/or message client may be configured to interface with a plurality of field message buses.

The first device and/or the field message bus 140 may be spaced apart from a data center (e.g., an electric utility data center 130) that includes an utility head end system H. Moreover, the field message bus 140 may be configured to provide communications independently of a data center message bus (e.g., the data center message bus 120) of the utility head end system H.

In some embodiments, a first device indicated with respect to FIGS. 11A-11D and 12A-12C may be an electric utility meter, a transformer, a light, an electric grid control device, an electric grid protection device, a line sensor, a weather sensor, an Advanced Metering Infrastructure (AMI) device, an analog or digital sensor connected to an electric utility asset, an electric generator, an electric turbine, an electric boiler, an electric vehicle, an intelligent switching device, a home appliance, a battery storage device, a capacitor device, a solar power device, a smart generation device, an emission monitoring device, a water heater, a thermostat, a server, or a voltage regulator.

Figure 13:
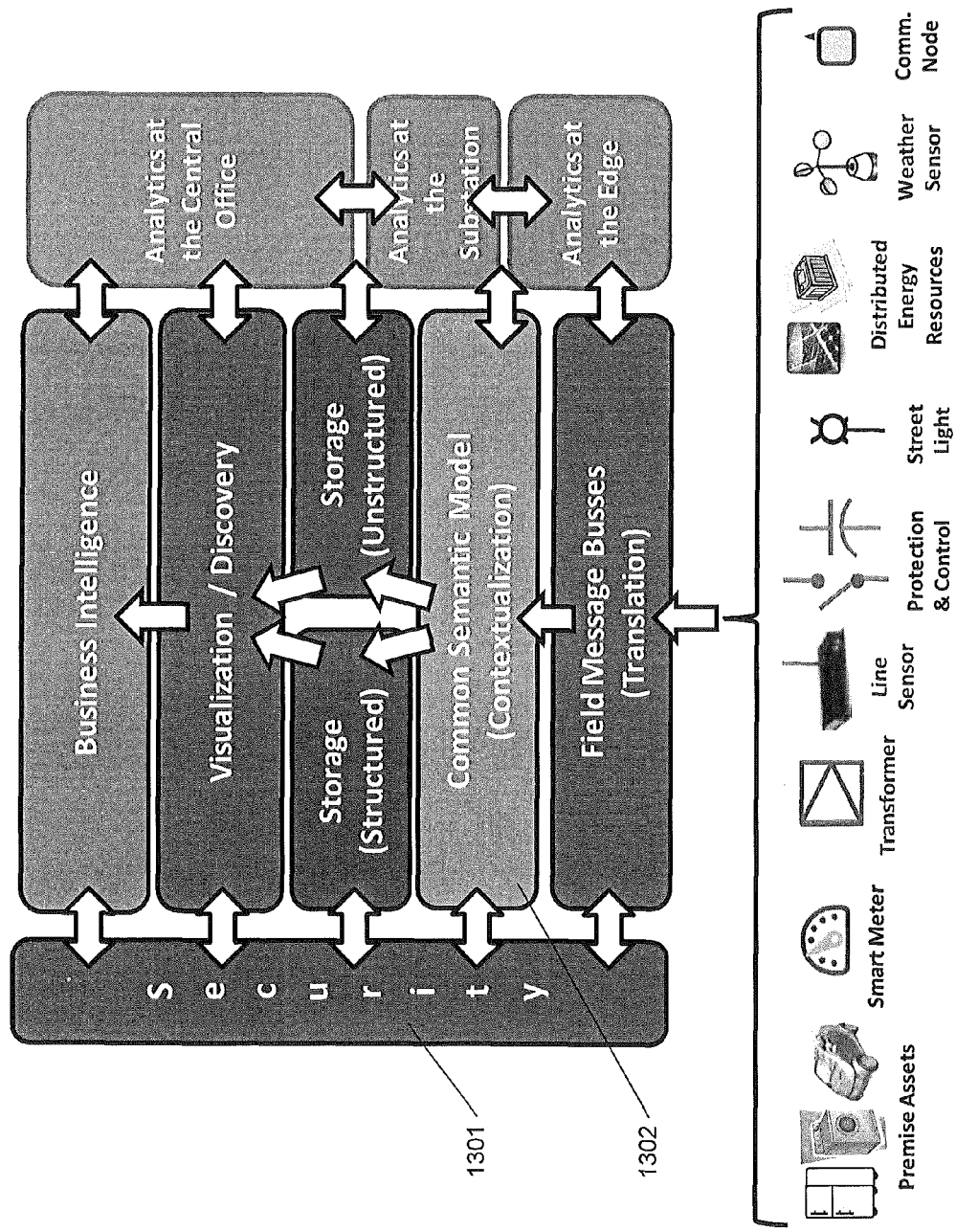
FIG. 13 illustrates a data modeling and analytics framework, according to various embodiments.

Referring now to FIG. 13, an illustration is provided of a data modeling and analytics framework, according to various embodiments. For example, FIG. 13 illustrates a security application 1301 that may be uniform across an entire enterprise. Moreover, FIG. 13 illustrates a common semantic model 1302 for the entire enterprise.

Protocols described according to various embodiments herein may be brokerless or may have a broker. A protocol described herein may provide mediation of data, as well as translation and contextualization. For example, a protocol described herein may have a physical broker that manages data routing and access to the field message bus 140. The broker may decide when devices/nodes can publish and subscribe to data/messages. As an example, the broker may let messages in and out at a given time interval (e.g., every second).

Alternatively, a protocol described herein may be brokerless (i.e., may have no broker at all). A brokerless protocol may be asynchronous and thus may allow devices/nodes to constantly publish and subscribe to data/messages, instead of using a schedule. Accordingly, as a particular device/node publishes/subscribes, it can continue to send messages until the messages go through, which may improve system reliability, robustness, speed, and scalability.

For example, a brokerless protocol may inherently share data through a semantic model. Specifically, a brokerless protocol may use Quality of Service (QoS) with a defined semantic model to share data. As an example, a brokerless protocol may use QoS as an input to define prioritization of traffic (e.g., to define high priority traffic) on a message bus. In other words, the protocol may use QoS to decide which traffic has priority, which may improve reliability of the network. Data Distribution Service (DDS) is one example of a brokerless protocol. Moreover, QoS can be used to manage security. For example, QoS may align with cyber-security applications that can use Quality of Trust (QoT) to impede abnormal or untrusted traffic from publishing or subscribing to the message bus.

In some embodiments, the devices/nodes described herein may communicate using both a brokered protocol and a brokerless protocol. For example, a protocol with a broker can communicate with a protocol that is brokerless. In some embodiments, the same device/node could use both a broker protocol and a brokerless protocol. Moreover, in some embodiments, different devices within the same network/system could communicate using different ones of a broker protocol and a brokerless protocol, respectively.

As an example of using both a brokered protocol and a brokerless protocol, a device/node that uses multiple message buses in a system may run Message Queuing Telemetry Transport (MQTT), which is a broker protocol, whereas a field area network (which shares data seamlessly across whole system) in the system may use a brokerless protocol. In other words, a local area network in the system may be brokered, whereas a field area network in the system may be brokerless. Moreover, multiple buses may run simultaneously with multiple different protocols that may be brokered or brokerless.

Regardless of whether a protocol is brokered or brokerless, the protocol may manage translation, contextualization, and routing via publishing and subscribing to data topics that are defined in a semantic model. In particular, a common semantic model 1302 may provide for contextualizing and seamlessly routing the data between publishers and subscribers on a message bus, thus improving the interchangeability of hardware and software. Moreover, a brokerless protocol may automatically discover data topics via the common semantic model 1302.

According to various embodiments, translation and semantic contextualization may be performed in a field area network, in end devices, and/or in customer-premise networks (e.g., local area networks of customers), instead of performing all translation and semantic contextualization between an enterprise application and head-end systems in a data center. Contextualization may refer to making sense of translated data. Moreover, according to various embodiments herein, contextualization refers to contextualizing data before it goes to a data center (e.g., the electric utility data center 130). In other words, contextualization may be provided/managed by a protocol outside of a data center, according to various embodiments herein. For example, a brokerless protocol outside of a data center may provide/manage the contextualization. Specifically, the protocol may add context to a message by adding schema such as an Extensible Markup Language (XML) Schema Definition (XSD) file, a Resource Description Framework (RDF) file, or an XML file. In particular, the protocol may add the schema to a virtual embedded environment that is hosting the message bus protocol.

Various embodiments described herein may provide an enterprise-wide cybersecurity platform 1301. For example, in some embodiments, a security application 1301 may run on top of a message bus API. Moreover, the security application 1301 may sit at multiple tiers of the enterprise rather than only at a data center. The security application 1301 may be on a communication node C, a customer device, or any virtual environment. In particular, instead of relying on different types of security in an enterprise, the security application 1301 may be on any/all devices/nodes in the enterprise, thus providing a uniform security application throughout the enterprise.

A semantic model may be a conceptual data model that may be defined by a particular utility company or by the broader utility industry. For example, a semantic model may provide a common definition of how different meters interpret the meaning of data. In other words, a semantic model may provide a common definition of how different meters measure voltage and power, and set alarms, among other meter functions. As an example, a semantic model may determine whether the meters measure voltage with one decimal point or two decimal points, among other decisions regarding how the meters interpret the meaning of data. According to various embodiments described herein, a common semantic model 1302 may be used as an input to a message bus (e.g., a field message bus 140).

In particular, the common semantic model 1302 (which may be one level up from schema that sits locally on every virtual environment of a field area network) may be provided throughout an entire system/enterprise. In other words, the common semantic model 1302 may be provided both before and after the message bus.

Moreover, the common semantic model 1302 may extensible such that it may be shared across the entire system/enterprise. In some embodiments, the common semantic model 1302 may be dynamically extensible, which means that extension of the common semantic 1302 model to a new element/aspect of the system/enterprise should not break the system/enterprise. Furthermore, in some embodiments, the system/enterprise may validate the common semantic model 1302 by checking/testing the common semantic model 1302 for consistency.

In some embodiments, a field message bus 140 may provide failover, compression, and persistence (e.g., log data for auditing) for data outside of a data center. For example, brokerless protocols may be placed in enterprise areas needing failover. The brokerless protocols may provide a distribution of different machines (e.g., devices or nodes) copying the same data. Accordingly, if one machine fails, the others should still have the data, thus providing redundancy (of information on the field message bus 140) outside of the data center.

In some embodiments, a field message bus 140 may enable remote firmware upgrades and can provide revision control. In other words, the field message bus 140 may provide common version control (common revisions) for applications, firmware, etc. Moreover, the common revisions can be performed remotely and sent to all devices/nodes in an enterprise.

Some embodiments may allow interrogation of other devices to discover capabilities and to configure the device (s) or database(s) collecting data. For example, a communications node C adjacent a meter may interrogate (i.e., ask) the meter, may discover (e.g., determine what the meter is capable of), and then may feed the information to a semantic model, which may then send the information to the entire network such that the entire network sees the capabilities. Moreover, the database may be inside a device such as a meter or a communications node C. Accordingly, interrogation and discovery of diagnostics may be provided for assets in a customer location (e.g., a home, a commercial building, or an industrial plant), a grid, a substation, and/or a power plant. Predictive capabilities may be enabled by data that is securely obtained and understood by a field message bus 140. For example, prediction may include analyzing data to predict capabilities or failures of a device.

Some embodiments may distribute computing across multiple different processors (and architecture types such as ARM, x86, etc.), memory partitions (and types such as Flash, RAM, SD, MMC, etc.), multiple operating systems, multiple virtual machines, and multiple physical nodes. In other words, computing may be distributed anywhere and everywhere in a system.

Moreover, some embodiments may allow optimization of processor and memory capacity/performance on a hosting device or on remote devices. Optimization may provided by sharing resources/capacity among multiple devices. For example, one communications node C can offload storage or processing to another communications node C. Accordingly, in addition to the low processing requirements of various embodiments described herein, resources/capacity of devices/nodes may be optimized/allocated (e.g., offloaded or split between devices/nodes).

Some embodiments may allow dynamic and adaptive programmability of Analog-to-Digital (A/D) converter chips (e.g., Field-Programmable Gate Array (FPGA) chips) that are connected to an analog Input/Output (I/O) block of a communications node C. In other words, some embodiments may use a message bus protocol to change the behavior of an FPGA (or any other type of hardware that is convertible/reprogrammable). For example, the message bus protocol can change the instructions of hardware, such as by telling (e.g., instructing/commanding) hardware that was previously functioning as a meter to function as something else. Moreover, such changes/reprogramming may be performed remotely. Accordingly, the message bus protocol can be used to redefine the function of hardware. Specifically, a general purpose A/D converter module may be provided on a node and may be reprogrammed. A/D capability may thus be provided anywhere in a network and can be accessed remotely from anywhere in the network.

According to various embodiments described herein, a field message bus 140 (rather than a head end system H) may obtain data from different protocols, and may then provide interoperability using a layer of translation (e.g., the common model/ETL mapping illustrated in FIG. 6). Moreover, the field message bus 140 may operate in the field of a utility system that includes a gas grid, an electric grid, or a water grid, and that may further include a telecommunications network, information technology (e.g., analytics, architecture, data management, etc.), sensors on a generator, weather devices, environmental devices, and/or customer devices. Furthermore, it will be understood that the utility system may have a distributed architecture including any number (e.g., 1, 2, 3, 4, or more) of tiers, assets/nodes/devices, applications (synchronous and asynchronous), and message buses, respectively.

In the specification, various embodiments of the present inventive concepts have been disclosed and, although specific terms are employed, they are used in a generic and descriptive sense only and not for purposes of limitation. Those skilled in the art will readily appreciate that many modifications are possible for the disclosed embodiments without materially departing from the teachings and advantages of the present inventive concepts. The present inventive concepts are defined by the following claims, with equivalents of the claims to be included therein.

What is claimed is:

1. A method of operating a communication node, the method comprising:
   using a message broker and/or message client controlled by a virtual machine in the communication node to provide a protocol to interface with a field message bus comprising a standards-based or open-source field message bus; and
   transmitting or receiving data corresponding to an electric grid device, via the field message bus,
   wherein the communication node is located in a field of a power grid of an electric utility,
   wherein the method further comprises using, at the communication node in the field, the protocol of the message broker and/or message client to interface with a translator unit that is between a device protocol and the field message bus, and
   wherein the translator unit is in the field.

2. The method of claim 1, wherein:
   the communication node comprises a first communication node;
   the field message bus interfaces with a second communication node; and
   the first and second communication nodes comprise respective peer communication nodes comprising the field message bus therebetween.

3. The method of claim 2, wherein the first and second communication nodes correspond to different first and second vendors, respectively.

4. The method of claim 2, wherein the first and second communication nodes correspond to different first and second hierarchical tiers, respectively, in a hierarchical arrangement of communication nodes.

5. The method of claim 1,
wherein the field message bus comprises a standards-based or open-source Application Programming Interface (API), and
wherein the method further comprises using the protocol of the message broker and/or message client to interface with a standards-based or open-source-API-based application in the communication node.

6. The method of claim 1, further comprising using the protocol of the message broker and/or message client to interface with a plurality of field message buses.

7. The method of claim 1, wherein the virtual machine operates using an application processor or a partition of a central processing unit of the communication node.

8. The method of claim 1, further comprising isolating an application processing unit of the communication node from a central processing unit of the communication node, using the virtual machine.

9. The method of claim 1, wherein the standards-based or open-source field message bus is broker-agnostic.

10. A computer program product comprising a non-transitory computer readable storage medium including computer readable program code therein configured to perform the method of claim 1.

11. A communication node, comprising:
a network interface configured to provide communications with a first electric grid device; and
a processor configured to control a virtual machine in the communication node, the virtual machine configured to provide a message broker and/or message client that is configured to interface with a field message bus and/or another communication node corresponding to a second electric grid device, wherein:
the field message bus comprises a common publish/subscription interface for an electric grid;
the field message bus comprises a standards-based or open-source field message bus;
the message broker and/or message client is configured to provide a protocol to interface with the field message bus; and
the virtual machine is configured to transmit or receive data corresponding to the second electric grid device, via the field message bus.

12. The communication node of claim 11, wherein:
the communication node comprises a first communication node;
the other communication node comprises a second communication node configured to interface with the field message bus; and
the first and second communication nodes comprise respective peer communication nodes comprising the field message bus therebetween.

13. The communication node of claim 12, wherein the first and second communication nodes correspond to different first and second vendors, respectively.

14. The communication node of claim 12, wherein the first and second communication nodes correspond to different first and second hierarchical tiers, respectively, in a hierarchical arrangement of communication nodes.

15. The communication node of claim 11, wherein the standards-based or open-source field message bus is broker-agnostic.

16. A communication node, comprising:
a network interface configured to provide communications with a first electric grid device; and
a processor configured to control a virtual machine in the communication node, the virtual machine configured to provide a message broker and/or message client that is configured to interface with a field message bus and/or another communication node corresponding to a second electric grid device, wherein:
the field message bus comprises a standards-based or open-source field message bus;
the message broker and/or message client is configured to provide a protocol to interface with the field message bus; and
the virtual machine is configured to transmit or receive data corresponding to the second electric grid device, via the field message bus,
wherein the protocol of the message broker and/or message client is configured to interface with a translator unit in the communication node that is between a device protocol and the field message bus.

17. The communication node of claim 11,
wherein the field message bus comprises a standards-based or open-source Application Programming Interface (API), and
wherein the protocol of the message broker and/or message client is configured to interface with a standards-based or open-source-API-based application in the communication node.

18. The communication node of claim 11, wherein the protocol of the message broker and/or message client is configured to interface with a plurality of field message buses.

19. The communication node of claim 11, wherein the virtual machine is configured to operate using an application processor or a partition of a central processing unit of the communication node.

20. The communication node of claim 11, wherein the virtual machine is configured to isolate an application processing unit of the communication node from a central processing unit of the communication node.

21. The communication node of claim 16, wherein the standards-based or open-source field message bus is broker-agnostic.

22. The communication node of claim 16, wherein the standards-based or open-source field message bus comprises a standards-based or open-source Application Programming Interface (API).

* * * * *